United States Patent
Zhang et al.

(10) Patent No.: US 10,182,408 B2
(45) Date of Patent: Jan. 15, 2019

(54) TRANSMIT POWER CONTROL COMMAND GENERATING METHOD, DEVICE, AND SYSTEM

(71) Applicant: Huawei Technologies Co., Ltd., Shenzhen (CN)

(72) Inventors: Peng Zhang, Shanghai (CN); Min Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/383,912

(22) Filed: Dec. 19, 2016

(65) Prior Publication Data

US 2017/0099642 A1    Apr. 6, 2017

Related U.S. Application Data

(63) Continuation of application No. PCT/CN2014/080421, filed on Jun. 20, 2014.

(51) Int. Cl.
*H04W 52/40* (2009.01)
*H04W 52/14* (2009.01)
(Continued)

(52) U.S. Cl.
CPC ......... *H04W 52/40* (2013.01); *H04W 52/143* (2013.01); *H04W 52/241* (2013.01); *H04W 52/286* (2013.01); *H04W 84/045* (2013.01)

(58) Field of Classification Search
CPC .............................. H04W 52/40; H04W 36/00
(Continued)

(56) References Cited

U.S. PATENT DOCUMENTS 8,200,229 B2 * 6/2012 Kaikkonen ........... H04W 36/18
370/318
2006/0246907 A1   11/2006 Kaikkonen et al.
(Continued)

FOREIGN PATENT DOCUMENTS

CN          1681221 A      10/2005
CN        101001469 A       7/2007
(Continued)

OTHER PUBLICATIONS

"Simulation results on HS-DPCCH power control," TSG-RAN Working Group 1 meeting #26, Gyeongju, Korea, R1-02-0760, 3$^{rd}$ Generation Partnership Project, Valbonne France (May 13-16, 2002).
(Continued)

*Primary Examiner* — John J Lee
(74) *Attorney, Agent, or Firm* — Leydig, Voit & Mayer, Ltd.

(57) ABSTRACT

The present invention provides a TPC command generating method, device, and system, and relates to the field of communications. The TPC command generating device includes: a first determining unit, configured to determine a target cell in at least one non-serving high speed downlink shared channel (HS-DSCH) cell included in an active set of user equipment; and a first generating unit, configured to generate a TPC command of the target cell according to a measurement result of a downlink channel of the target cell. The present invention can solve a problem that no valid TPC command can be generated for any non-serving HS-DSCH cell, thereby achieving an effect of at least generating a TPC command corresponding to a target cell. The TPC command generating method, device, and system that are provided in the present invention TPC command are used for generating a TPC command.

8 Claims, 9 Drawing Sheets

(51) Int. Cl.
*H04W 52/24* (2009.01)
*H04W 52/28* (2009.01)
*H04W 84/04* (2009.01)

(58) Field of Classification Search
USPC ... 455/522, 452.1, 69, 509, 439, 437, 452.2, 455/501
See application file for complete search history.

(56) References Cited

U.S. PATENT DOCUMENTS

| | | |
|---|---|---|
| 2006/0246937 A1 | 11/2006 | Lindoff et al. |
| 2006/0274712 A1 | 12/2006 | Malladi et al. |
| 2008/0070578 A1 | 3/2008 | Flore et al. |
| 2008/0200202 A1 | 8/2008 | Montojo et al. |
| 2013/0322374 A1 | 12/2013 | Cai et al. |
| 2014/0169331 A1 | 6/2014 | Yang et al. |
| 2015/0065135 A1 | 3/2015 | Claussen et al. |
| 2015/0289184 A1* | 10/2015 | Sarkar ............... H04W 36/18 455/442 |
| 2016/0057715 A1* | 2/2016 | Wang ............... H04W 52/40 455/522 |
| 2017/0055189 A1* | 2/2017 | Xu ............... H04W 36/0066 |

FOREIGN PATENT DOCUMENTS

| | | |
|---|---|---|
| CN | 101185257 A | 5/2008 |
| CN | 101611564 A | 12/2009 |
| CN | 201752139 U | 2/2011 |
| CN | 102264113 A | 11/2011 |
| CN | 103688577 A | 3/2014 |
| CN | 103716868 A | 4/2014 |
| CN | 103874186 A | 6/2014 |
| CN | 104105183 A | 10/2014 |
| CN | 104170458 A | 11/2014 |
| CN | 104254118 A | 12/2014 |
| EP | 3043603 A1 | 7/2016 |
| RU | 2377725 C2 | 12/2009 |
| RU | 2426272 C2 | 8/2011 |
| WO | 2005009070 A1 | 1/2005 |

OTHER PUBLICATIONS

"3$^{rd}$ Generation Partnership Project; Technical Specification Group Radio Access Network; Physical layer procedures (FDD) (Release 11)," 3GPP TS 25.214, V11.9.0, pp. 1-128, 3$^{rd}$ Generation Partnership Project, Valbonne, France (Jun. 2014).

"3$^{rd}$ Generation Partnership Project; Technical Specification Group Radio Access Network; Radio Resource Control (RRC); Protocol specification (Release 12)," 3GPP TS 25.331, V12.1.0, pp. 1-2120, 3$^{rd}$ Generation Partnership Project, Valbonne, France (Mar. 2014).

* cited by examiner

TRANSMIT POWER CONTROL COMMAND GENERATING METHOD, DEVICE, AND SYSTEM

CROSS-REFERENCE TO RELATED APPLICATIONS

This application is a continuation of International Patent Application No. PCT/CN2014/080421 filed on Jun. 20, 2014, the disclosure of which is hereby incorporated by reference in its entirety.

TECHNICAL FIELD

The present invention relates to the field of communications, and in particular, to a transmit power control command generating method, device, and system.

BACKGROUND

A Hetnet (heterogeneous network) is a network including a micro base station and a macro base station (Macro).

In a Hetnet, soft handover is a handover process, a soft handover area refers to an area in which soft handover occurs, and an active set is a set of cells participating in a soft handover process of UE. When UE (user equipment) is located in a soft handover area of a macro base station cell and a micro base station cell, the macro base station cell and the micro base station cell are both located in an active set of the UE; and when the macro base station cell is a serving HS-DSCH (high speed downlink shared channel) cell, and the micro base station is a non-serving HS-DSCH cell, an RNC (radio network controller) may configure an F-DPCH (fractional dedicated physical channel) for the serving HS-DSCH cell and the non-serving HS-DSCH cell separately, and configure a first DPCCH (dedicated physical control channel) and a second DPCCH for the UE. The first DPCCH carries a TPC (transmit power control) command used to adjust transmit power of the F-DPCH of the non-serving HS-DSCH cell, and the second DPCCH carries a TPC command used to adjust transmit power of the F-DPCH of the serving HS-DSCH cell.

In the prior art, an active set of UE generally includes one serving HS-DSCH cell and one non-serving HS-DSCH cell; an RNC delivers a target TPC error rate to the UE. The UE acquires a target F-DPCH SIR (signal-to-interference ratio) corresponding to the target TPC error rate; then measures an F-DPCH of the serving HS-DSCH cell and that of the non-serving HS-DSCH cell to obtain a measured F-DPCH SIR of the serving HS-DSCH cell and a measured F-DPCH SIR of the non-serving HS-DSCH cell, and separately compares the measured F-DPCH SIR of the serving HS-DSCH cell and the measured F-DPCH SIR of the non-serving HS-DSCH cell with the target F-DPCH SIR. The UE generates, according to a comparison result, a first TPC command for adjusting transmit power of the F-DPCH of the serving HS-DSCH cell and a second TPC command for adjusting transmit power of the F-DPCH of the non-serving HS-DSCH cell. Subsequently, the serving HS-DSCH cell adjusts the transmit power of the F-DPCH of the serving HS-DSCH cell according to the first TPC command, and the non-serving HS-DSCH cell adjusts the transmit power of the F-DPCH of the non-serving HS-DSCH cell according to the second TPC command.

However, if the active set of the UE includes one serving HS-DSCH cell and multiple non-serving HS-DSCH cells, because an F-DPCH is configured for each non-serving HS-DSCH cell, the UE cannot determine an F-DPCH of which non-serving HS-DSCH cell should be measured, and therefore cannot generate a corresponding TPC command for any non-serving HS-DSCH cell.

SUMMARY

A transmit power control command generating method, device, and system that are provided in the present invention can solve a problem that no valid TPC command can be generated for any non-serving HS-DSCH cell.

To achieve the foregoing objective, the following technical solutions are used in embodiments of the present invention:

According to a first aspect, a transmit power control TPC command generating device is provided, including:

a first determining unit, configured to determine a target cell in at least one non-serving high speed downlink shared channel HS-DSCH cell included in an active set of user equipment; and a first generating unit, configured to generate a TPC command of the target cell according to a measurement result of a downlink channel of the target cell.

In a first possible implementation manner of the first aspect, the first determining unit includes:

a first determining module, configured to determine the target cell in the at least one non-serving HS-DSCH cell by using indication information acquired from a control device, where the indication information is used to instruct the user equipment to determine the target cell in the at least one non-serving HS-DSCH cell.

With reference to the first possible implementation manner, in a second possible implementation manner, the indication information is cell indication information, and the cell indication information is used to identify the target cell, and
the first determining module is specifically configured to:
receive the cell indication information sent by the control device; and
determine, according to the cell indication information, a cell corresponding to the cell indication information in the at least one non-serving HS-DSCH cell as the target cell.

With reference to the second possible implementation manner, in a third possible implementation manner, the cell indication information includes at least one of a radio link identifier, a cell scrambling code, and a cell identifier.

With reference to the first possible implementation manner, in a fourth possible implementation manner, the indication information is a subsidiary indication configured for a downlink channel of the non-serving HS-DSCH cell, and
the first determining module is specifically configured to:
when the subsidiary indication is configured for the downlink channel of the at least one non-serving HS-DSCH cell, acquire the subsidiary indication; and
determine the target cell in the at least one non-serving HS-DSCH cell according to the subsidiary indication.

In a fifth possible implementation manner of the first aspect, the first determining unit is specifically configured to:
after an uplink serving cell and a downlink serving cell of the user equipment are decoupled, acquire a serving enhanced dedicated channel E-DCH cell in the at least one non-serving HS-DSCH cell; and
determine the serving E-DCH cell as the target cell.

In a sixth possible implementation manner of the first aspect, the first determining unit is specifically configured to:

acquire an assisting serving HS-DSCH cell in the at least one non-serving HS-DSCH cell; and determine the assisting serving HS-DSCH cell as the target cell.

In a seventh possible implementation manner of the first aspect, the first determining unit includes:

a first measurement module, configured to measure preset parameters of all non-serving HS-DSCH cells in the at least one non-serving HS-DSCH cell; and a second determining module, configured to determine the target cell in the at least one non-serving HS-DSCH cell according to measurement results of the preset parameters.

With reference to the seventh possible implementation manner, in an eighth possible implementation manner, the preset parameter is a channel quality value of the downlink channel, and the second determining module is specifically configured to:

determine a non-serving HS-DSCH cell having a downlink channel with the worst channel quality value in all the non-serving HS-DSCH cells as the target cell; or determine a non-serving HS-DSCH cell having a downlink channel with the best channel quality value in all the non-serving HS-DSCH cells as the target cell.

With reference to the seventh possible implementation manner, in a ninth possible implementation manner, the preset parameter is a path loss between the non-serving HS-DSCH cell and the user equipment, and the second determining module is specifically configured to:

determine a non-serving HS-DSCH cell between which and the user equipment a path loss is smallest as the target cell.

In a tenth possible implementation manner of the first aspect, the first determining unit is specifically configured to:

determine all non-serving HS-DSCH cells in the at least one non-serving HS-DSCH cell as the target cells.

With reference to any one of the first aspect and the first to the tenth possible implementation manners of the first aspect, in an eleventh possible implementation manner, the first generating unit is specifically configured to:

when at least two target cells exist, measure quality of downlink channels of all the target cells;

perform a weighted average calculation on measured channel quality values of the downlink channels of all the target cells that are obtained through measurement, to obtain a comprehensive channel quality value;

compare the comprehensive channel quality value with an acquired target channel quality value; and generate a TPC command according to a comparison result.

With reference to any one of the first aspect and the first to the eleventh possible implementation manners of the first aspect, in a twelfth possible implementation manner, the active set of the user equipment further includes a serving HS-DSCH cell, and the TPC command generating device further includes:

a receiving unit, configured to receive a first measurement parameter sent by the control device;

a second determining unit, configured to determine a first target channel quality value according to the first measurement parameter;

a measurement unit, configured to measure a downlink channel of the serving HS-DSCH cell to obtain a first measured channel quality value;

a comparison unit, configured to compare the first target channel quality value with the first measured channel quality value; and a second generating unit, configured to generate a TPC command of the serving HS-DSCH cell according to a comparison result, where the TPC command of the serving HS-DSCH cell is used to instruct to adjust transmit power of the serving HS-DSCH cell; and the first generating unit includes:

a receiving module, configured to receive a second measurement parameter sent by the control device;

a third determining module, configured to determine a second target channel quality value according to the second measurement parameter;

a fourth determining module, configured to measure the downlink channel of the target cell to obtain a second measured channel quality value;

a comparison module, configured to compare the second target channel quality value with the second measured channel quality value; and a generating module, configured to generate the TPC command of the target cell according to a comparison result, where the TPC command of the target cell is used to instruct to adjust transmit power of the target cell.

With reference to the twelfth possible implementation manner, in a thirteenth possible implementation manner, the first measurement parameter is a first TPC error rate, and the second measurement parameter is a second TPC error rate, and the second determining unit is specifically configured to:

determine, according to the first TPC error rate, a target signal-to-interference ratio SIR corresponding to the first TPC error rate; and use the target SIR as the first target channel quality value; and the fourth determining module is specifically configured to:

determine, according to the second TPC error rate, a target SIR corresponding to the second TPC error rate; and use the target SIR as the second target channel quality value.

With reference to any one of the first aspect and the first to the thirteenth possible implementation manners of the first aspect, in a fourteenth possible implementation manner, the downlink channel is a fractional dedicated physical channel F-DPCH or a dedicated physical channel DPCH.

With reference to any one of the first aspect and the first to the fourteenth possible implementation manners of the first aspect, in a fifteenth possible implementation manner, the at least one non-serving HS-DSCH cell includes at least one of the assisting serving HS-DSCH cell and the serving E-DCH cell.

According to a second aspect, a transmit power control TPC command generating device is provided, including:

a generating unit, configured to generate indication information, where the indication information is used to instruct user equipment to determine a target cell in at least one non-serving high speed downlink shared channel HS-DSCH cell included in an active set of the user equipment; and a first sending unit, configured to send the indication information to the user equipment, so that the user equipment generates a TPC command of the target cell according to a measurement result of a downlink channel of the determined target cell.

In a first possible implementation manner of the second aspect, the indication information is cell indication information, and the cell indication information is used to identify the target cell.

With reference to the first possible implementation manner, in a second possible implementation manner, the cell indication information includes at least one of a radio link identifier, a cell scrambling code, and a cell identifier.

With reference to the third possible implementation manner of the second aspect, the indication information is a subsidiary indication configured for a downlink channel of the non-serving HS-DSCH cell, and the generating unit is specifically configured to:

configure the subsidiary indication for the downlink channel of the at least one non-serving HS-DSCH cell.

With reference to any one of the second aspect and the first to the third possible implementation manners of the second aspect, in a fourth possible implementation manner, the active set of the user equipment further includes a serving HS-DSCH cell, and the TPC command generating device further includes:

a second sending unit, configured to send a first measurement parameter to the user equipment, so that the user equipment determines a first target channel quality value according to the first measurement parameter, measures a downlink channel of the serving HS-DSCH cell to obtain a first measured channel quality value, compares the first target channel quality value with the first measured channel quality value, and generates a TPC command of the serving HS-DSCH cell according to a comparison result; and a third sending unit, configured to send a second measurement parameter to the user equipment, so that the user equipment determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell.

With reference to the fourth possible implementation manner, in a fifth possible implementation manner, the first measurement parameter is a first TPC error rate, and the second measurement parameter is a second TPC error rate.

With reference to any one of the second aspect and the first to the fifth possible implementation manners of the second aspect, in a sixth possible implementation manner, the TPC command generating device is applied to a control device, and the control device is a radio network controller RNC or a base station.

With reference to any one of the second aspect and the first to the sixth possible implementation manners of the second aspect, in a seventh possible implementation manner, the downlink channel is an F-DPCH or a dedicated physical channel DPCH.

With reference to any one of the second aspect and the first to the seventh possible implementation manners of the second aspect, in an eighth possible implementation manner, the at least one non-serving HS-DSCH cell includes at least one of an assisting serving HS-DSCH cell and a serving E-DCH cell.

According to a third aspect, a transmit power control TPC command generating system is provided, where the TPC command generating system includes user equipment and a control device, where the user equipment includes any TPC command generating device according to the first aspect; and the control device includes any TPC command generating device according to the second aspect.

According to a fourth aspect, a transmit power control TPC command generating device is provided, including:

a processor, configured to determine a target cell in at least one non-serving high speed downlink shared channel HS-DSCH cell included in an active set of user equipment, where the processor is further configured to generate a TPC command of the target cell according to a measurement result of a downlink channel of the target cell.

In a first possible implementation manner of the fourth aspect, the processor is specifically configured to:

determine the target cell in the at least one non-serving HS-DSCH cell by using indication information acquired from a control device, where the indication information is used to instruct the user equipment to determine the target cell in the at least one non-serving HS-DSCH cell.

With reference to the first possible implementation manner, in a second possible implementation manner, the indication information is cell indication information, and the cell indication information is used to identify the target cell, and the TPC command generating device further includes:

a first receiver, configured to receive the cell indication information sent by the control device; and the processor is further configured to determine, according to the cell indication information, a cell corresponding to the cell indication information in the at least one non-serving HS-DSCH cell as the target cell.

With reference to the second possible implementation manner, in a third possible implementation manner, the cell indication information includes at least one of a radio link identifier, a cell scrambling code, and a cell identifier.

With reference to the first possible implementation manner, in a fourth possible implementation manner, the indication information is a subsidiary indication configured for a downlink channel of the non-serving HS-DSCH cell, and the processor is specifically configured to:

when the subsidiary indication is configured for the downlink channel of the at least one non-serving HS-DSCH cell, acquire the subsidiary indication; and determine the target cell in the at least one non-serving HS-DSCH cell according to the subsidiary indication.

In a fifth possible implementation manner of the fourth aspect, the processor is specifically configured to:

after an uplink serving cell and a downlink serving cell of the user equipment are decoupled, acquire a serving enhanced dedicated channel E-DCH cell in the at least one non-serving HS-DSCH cell; and determine the serving E-DCH cell as the target cell.

In a sixth possible implementation manner of the fourth aspect, the processor is specifically configured to:

acquire an assisting serving HS-DSCH cell in the at least one non-serving HS-DSCH cell; and determine the assisting serving HS-DSCH cell as the target cell.

In a seventh possible implementation manner of the fourth aspect, the processor is specifically configured to:

measure preset parameters of all non-serving HS-DSCH cells in the at least one non-serving HS-DSCH cell; and determine the target cell in the at least one non-serving HS-DSCH cell according to measurement results of the preset parameters.

With reference to the seventh possible implementation manner, in an eighth possible implementation manner, the preset parameter is a channel quality value of the downlink channel, and the processor is specifically configured to:

determine a non-serving HS-DSCH cell having a downlink channel with the worst channel quality value in all the non-serving HS-DSCH cells as the target cell; or determine a non-serving HS-DSCH cell having a downlink channel with the best channel quality value in all the non-serving HS-DSCH cells as the target cell.

With reference to the seventh possible implementation manner, in a ninth possible implementation manner, the preset parameter is a path loss between the non-serving HS-DSCH cell and the user equipment, and the processor is specifically configured to:

determine a non-serving HS-DSCH cell between which and the user equipment a path loss is smallest as the target cell.

In a tenth possible implementation manner of the fourth aspect, the processor is specifically configured to:

determine all non-serving HS-DSCH cells in the at least one non-serving HS-DSCH cell as the target cells.

With reference to any one of the fourth aspect and the first to the tenth possible implementation manners of the fourth aspect, in an eleventh possible implementation manner, the processor is specifically configured to:

when at least two target cells exist, measure quality of downlink channels of all the target cells;

perform a weighted average calculation on measured channel quality values of the downlink channels of all the target cells that are obtained through measurement, to obtain a comprehensive channel quality value;

compare the comprehensive channel quality value with an acquired target channel quality value; and generate a TPC command according to a comparison result.

With reference to any one of the fourth aspect and the first to the eleventh possible implementation manners of the fourth aspect, in a twelfth possible implementation manner, the active set of the user equipment further includes a serving HS-DSCH cell, and the TPC command generating device further includes:

a second receiver, configured to receive a first measurement parameter sent by the control device, where the processor is further configured to:

determine a first target channel quality value according to the first measurement parameter;

measure a downlink channel of the serving HS-DSCH cell to obtain a first measured channel quality value;

compare the first target channel quality value with the first measured channel quality value; and generate a TPC command of the serving HS-DSCH cell according to a comparison result, where the TPC command of the serving HS-DSCH cell is used to instruct to adjust transmit power of the serving HS-DSCH cell; and the receiver is further configured to receive a second measurement parameter sent by the control device, wherein the processor is further configured to:

determine a second target channel quality value according to the second measurement parameter;

measure the downlink channel of the target cell to obtain a second measured channel quality value;

compare the second target channel quality value with the second measured channel quality value; and generate the TPC command of the target cell according to a comparison result, where the TPC command of the target cell is used to instruct to adjust transmit power of the target cell.

With reference to the twelfth possible implementation manner, in a thirteenth possible implementation manner, the first measurement parameter is a first TPC error rate, and the second measurement parameter is a second TPC error rate, and the processor is specifically configured to:

determine, according to the first TPC error rate, a target signal-to-interference ratio SIR corresponding to the first TPC error rate; and use the target SIR as the first target channel quality value; and the processor is specifically configured to:

determine, according to the second TPC error rate, a target SIR corresponding to the second TPC error rate; and use the target SIR as the second target channel quality value.

With reference to any one of the fourth aspect and the first to the thirteenth possible implementation manners of the fourth aspect, in a fourteenth possible implementation manner, the downlink channel is a fractional dedicated physical channel F-DPCH or a dedicated physical channel DPCH.

With reference to any one of the fourth aspect and the first to the fourteenth possible implementation manners of the fourth aspect, in a fifteenth possible implementation manner, the at least one non-serving HS-DSCH cell includes at least one of the assisting serving HS-DSCH cell and the serving E-DCH cell.

According to a fifth aspect, a transmit power control TPC command generating device is provided, including:

a processor, configured to generate indication information, where the indication information is used to instruct user equipment to determine a target cell in at least one non-serving high speed downlink shared channel HS-DSCH cell included in an active set of the user equipment; and a transmitter, configured to send the indication information to the user equipment, so that the user equipment generates a TPC command of the target cell according to a measurement result of a downlink channel of the determined target cell.

In a first possible implementation manner of the fifth aspect, the indication information is cell indication information, and the cell indication information is used to identify the target cell.

With reference to the first possible implementation manner, in a second possible implementation manner, the cell indication information includes at least one of a radio link identifier, a cell scrambling code, and a cell identifier.

With reference to the third possible implementation manner of the fifth aspect, the indication information is a subsidiary indication configured for a downlink channel of the non-serving HS-DSCH cell, and the processor is specifically configured to:

configure the subsidiary indication for the downlink channel of the at least one non-serving HS-DSCH cell.

With reference to any one of the fifth aspect and the first to the third possible implementation manners of the fifth aspect, in a fourth possible implementation manner, the active set of the user equipment further includes a serving HS-DSCH cell, and the transmitter is further configured to:

send a first measurement parameter to the user equipment, so that the user equipment determines a first target channel quality value according to the first measurement parameter, measures a downlink channel of the serving HS-DSCH cell to obtain a first measured channel quality value, compares the first target channel quality value with the first measured channel quality value, and generates a TPC command of the serving HS-DSCH cell according to a comparison result; and send a second measurement parameter to the user equipment, so that the user equipment determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell.

With reference to the fourth possible implementation manner, in a fifth possible implementation manner, the first measurement parameter is a first TPC error rate, and the second measurement parameter is a second TPC error rate.

With reference to any one of the fifth aspect and the first to the fifth possible implementation manners of the fifth aspect, in a sixth possible implementation manner, the TPC command generating device is applied to a control device, and the control device is a radio network controller RNC or a base station.

With reference to any one of the fifth aspect and the first to the sixth possible implementation manners of the fifth aspect, in a seventh possible implementation manner, the downlink channel is an F-DPCH or a dedicated physical channel DPCH.

With reference to any one of the fifth aspect and the first to the seventh possible implementation manners of the fifth aspect, in an eighth possible implementation manner, the at least one non-serving HS-DSCH cell includes at least one of the assisting serving HS-DSCH cell and the serving E-DCH cell.

According to a sixth aspect, a transmit power control TPC command generating system is provided, where the TPC command generating system includes user equipment and a control device, where the user equipment includes any TPC command generating device according to the fourth aspect; and the control device includes any TPC command generating device according to the fifth aspect.

According to the sixth aspect, a transmit power control TPC command generating method is provided, including:

determining a target cell in at least one non-serving high speed downlink shared channel HS-DSCH cell included in an active set of user equipment; and generating a TPC command of the target cell according to a measurement result of a downlink channel of the target cell.

In a first possible implementation manner of the sixth aspect, the determining a target cell in at least one non-serving high speed downlink shared channel HS-DSCH cell included in an active set of user equipment includes:

determining the target cell in the at least one non-serving HS-DSCH cell by using indication information acquired from a control device, where the indication information is used to instruct the user equipment to determine the target cell in the at least one non-serving HS-DSCH cell.

With reference to the first possible implementation manner, in a second possible implementation manner, the indication information is cell indication information, and the cell indication information is used to identify the target cell, and the determining the target cell in the at least one non-serving HS-DSCH cell by using indication information acquired from a control device includes:

receiving the cell indication information sent by the control device; and determining, according to the cell indication information, a cell corresponding to the cell indication information in the at least one non-serving HS-DSCH cell as the target cell.

With reference to the second possible implementation manner, in a third possible implementation manner, the cell indication information includes at least one of a radio link identifier, a cell scrambling code, and a cell identifier.

With reference to the first possible implementation manner, in a fourth possible implementation manner, the indication information is a subsidiary indication configured for a downlink channel of the non-serving HS-DSCH cell, and the determining the target cell in the at least one non-serving HS-DSCH cell by using indication information acquired from a control device includes:

when the subsidiary indication is configured for the downlink channel of the at least one non-serving HS-DSCH cell, acquiring the subsidiary indication; and determining the target cell in the at least one non-serving HS-DSCH cell according to the subsidiary indication.

In a fifth possible implementation manner of the sixth aspect, the determining a target cell in at least one non-serving high speed downlink shared channel HS-DSCH cell included in an active set of user equipment includes:

after an uplink serving cell and a downlink serving cell of the user equipment are decoupled, acquiring a serving enhanced dedicated channel E-DCH cell in the at least one non-serving HS-DSCH cell; and determining the serving E-DCH cell as the target cell.

In a sixth possible implementation manner of the sixth aspect, the determining a target cell in at least one non-serving high speed downlink shared channel HS-DSCH cell included in an active set of user equipment includes:

acquiring an assisting serving HS-DSCH cell in the at least one non-serving HS-DSCH cell; and determining the assisting serving HS-DSCH cell as the target cell.

In a seventh possible implementation manner of the sixth aspect, the determining a target cell in at least one non-serving high speed downlink shared channel HS-DSCH cell included in an active set of user equipment includes:

measuring preset parameters of all non-serving HS-DSCH cells in the at least one non-serving HS-DSCH cell; and determining the target cell in the at least one non-serving HS-DSCH cell according to measurement results of the preset parameters.

With reference to the seventh possible implementation manner, in an eighth possible implementation manner, the preset parameter is a channel quality value of the downlink channel, and the determining the target cell according to measurement results of the preset parameters includes:

determining a non-serving HS-DSCH cell having a downlink channel with the worst channel quality value in all the non-serving HS-DSCH cells as the target cell; or determining a non-serving HS-DSCH cell having a downlink channel with the best channel quality value in all the non-serving HS-DSCH cells as the target cell.

With reference to the seventh possible implementation manner, in a ninth possible implementation manner, the preset parameter is a path loss between the non-serving HS-DSCH cell and the user equipment, and the determining the target cell according to measurement results of the preset parameters includes:

determining a non-serving HS-DSCH cell between which and the user equipment a path loss is smallest as the target cell.

In a tenth possible implementation manner of the sixth aspect, the determining a target cell in at least one non-serving high speed downlink shared channel HS-DSCH cell included in an active set of user equipment includes:

determining all non-serving HS-DSCH cells in the at least one non-serving HS-DSCH cell as the target cells.

With reference to any one of the sixth aspect and the first to the tenth possible implementation manners of the sixth aspect, in an eleventh possible implementation manner, the generating a TPC command according to a measurement result of a downlink channel of the target cell includes:

when at least two target cells exist, measuring quality of downlink channels of all the target cells;

performing a weighted average calculation on measured channel quality values of the downlink channels of all the target cells that are obtained through measurement, to obtain a comprehensive channel quality value;

comparing the comprehensive channel quality value with an acquired target channel quality value; and generating a TPC command according to a comparison result.

With reference to any one of the sixth aspect and the first to the eleventh possible implementation manners of the sixth aspect, in a twelfth possible implementation manner, the active set of the user equipment further includes a serving HS-DSCH cell, and the method further includes:

receiving a first measurement parameter sent by the control device;

determining a first target channel quality value according to the first measurement parameter;

measuring a downlink channel of the serving HS-DSCH cell to obtain a first measured channel quality value;

comparing the first target channel quality value with the first measured channel quality value; and generating a TPC command of the serving HS-DSCH cell according to a comparison result, where the TPC command of the serving HS-DSCH cell is used to instruct to adjust transmit power of the serving HS-DSCH cell; and the generating a TPC command of the target cell according to a measurement result of a downlink channel of the target cell includes:

receiving a second measurement parameter sent by the control device;

determining a second target channel quality value according to the second measurement parameter;

measuring the downlink channel of the target cell to obtain a second measured channel quality value;

comparing the second target channel quality value with the second measured channel quality value; and generating the TPC command of the target cell according to a comparison result, where the TPC command of the target cell is used to instruct to adjust transmit power of the target cell.

With reference to the twelfth possible implementation manner, in a thirteenth possible implementation manner, the first measurement parameter is a first TPC error rate, and the second measurement parameter is a second TPC error rate, and the determining a first target channel quality value according to the first measurement parameter includes:

determining, according to the first TPC error rate, a target signal-to-interference ratio SIR corresponding to the first TPC error rate; and using the target SIR as the first target channel quality value; and the determining a second target channel quality value according to the second measurement parameter includes:

determining, according to the second TPC error rate, a target SIR corresponding to the second TPC error rate; and using the target SIR as the second target channel quality value.

With reference to any one of the sixth aspect and the first to the thirteenth possible implementation manners of the sixth aspect, in a fourteenth possible implementation manner, the downlink channel is a fractional dedicated physical channel F-DPCH or a dedicated physical channel DPCH.

With reference to any one of the sixth aspect and the first to the fourteenth possible implementation manners of the sixth aspect, in a fifteenth possible implementation manner, the at least one non-serving HS-DSCH cell includes at least one of the assisting serving HS-DSCH cell and the serving E-DCH cell.

According to a seventh aspect, a transmit power control TPC command generating method is provided, including:

generating indication information, where the indication information is used to instruct user equipment to determine a target cell in at least one non-serving high speed downlink shared channel HS-DSCH cell included in an active set of the user equipment; and sending the indication information to the user equipment, so that the user equipment generates a TPC command of the target cell according to a measurement result of a downlink channel of the determined target cell.

In a first possible implementation manner of the seventh aspect, the indication information is cell indication information, and the cell indication information is used to identify the target cell.

With reference to the first possible implementation manner, in a second possible implementation manner, the cell indication information includes at least one of a radio link identifier, a cell scrambling code, and a cell identifier.

In the third possible implementation manner of the seventh aspect, the indication information is a subsidiary indication configured for a downlink channel of the non-serving HS-DSCH cell, and the generating indication information includes:

configuring the subsidiary indication for the downlink channel of the at least one non-serving HS-DSCH cell.

With reference to any one of the seventh aspect and the first to the third possible implementation manners of the seventh aspect, in a fourth possible implementation manner, the active set of the user equipment further includes a serving HS-DSCH cell, and after the sending the indication information to the user equipment, the method further includes:

sending a first measurement parameter to the user equipment, so that the user equipment determines a first target channel quality value according to the first measurement parameter, measures a downlink channel of the serving HS-DSCH cell to obtain a first measured channel quality value, compares the first target channel quality value with the first measured channel quality value, and generates a TPC command of the serving HS-DSCH cell according to a comparison result; and sending a second measurement parameter to the user equipment, so that the user equipment determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell.

With reference to the fourth possible implementation manner, in a fifth possible implementation manner, the first measurement parameter is a first TPC error rate, and the second measurement parameter is a second TPC error rate.

With reference to any one of the seventh aspect and the first to the fifth possible implementation manners of the seventh aspect, in a sixth possible implementation manner, the downlink channel is an F-DPCH or a dedicated physical channel DPCH.

With reference to any one of the seventh aspect and the first to the sixth possible implementation manners of the seventh aspect, in a seventh possible implementation manner, the at least one non-serving HS-DSCH cell includes at least one of the assisting serving HS-DSCH cell and the serving E-DCH cell.

According to the transmit power control command generating method, device, and system that are provided in the present invention, UE determines a target cell in at least one non-serving HS-DSCH cell, so that the UE can determine to measure a downlink channel of which non-serving HS-DSCH cell, and therefore, obtain a corresponding measurement result, and generate a TPC command of the target cell according to the measurement result, thereby at least generating the TPC command corresponding to the target cell.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the implementation manners of the present invention in detail with reference to the accompanying drawings.

Figure 1:
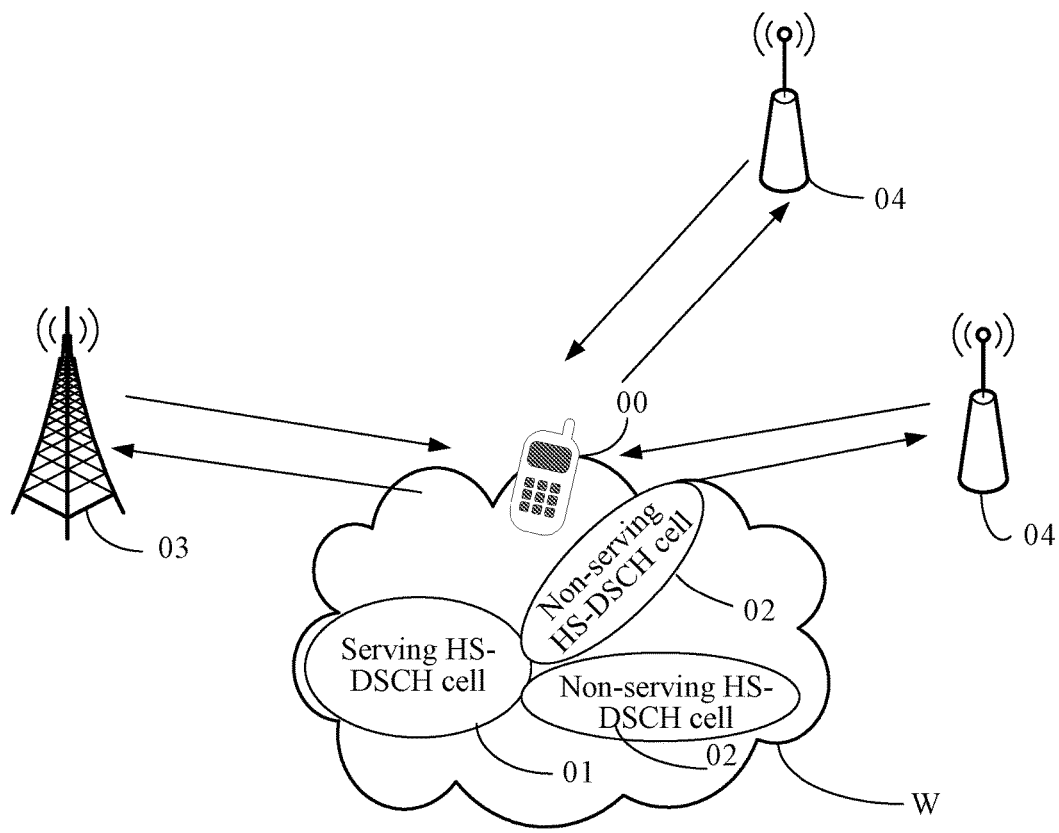
FIG. 1 is a schematic structural diagram of an environment of a communications network according to an embodiment of the present invention.

Refer to FIG. 1, FIG. 1 is a schematic structural diagram of an environment of a communications network involved in a TPC command generating method according to an embodiment of the present invention. In this communications network, an active set W of UE 00 includes at least two cells, which are a serving HS-DSCH cell 01 and at least one non-serving HS-DSCH cell 02, and the at least one non-serving HS-DSCH cell 02 may include but is not limited to at least one of an assisting serving HS-DSCH cell and a serving E-DCH (enhanced dedicated channel) cell. The serving HS-DSCH cell 01 is generally a macro base station cell managed by a macro base station 03, and the non-serving HS-DSCH cell 02 is generally a micro base station cell managed by a micro base station 04. The active set W is a set of cells participating in a soft handover process of the UE, and soft handover is an existing handover process, for which no unnecessary details are given in this embodiment of the present invention.

Figure 2:
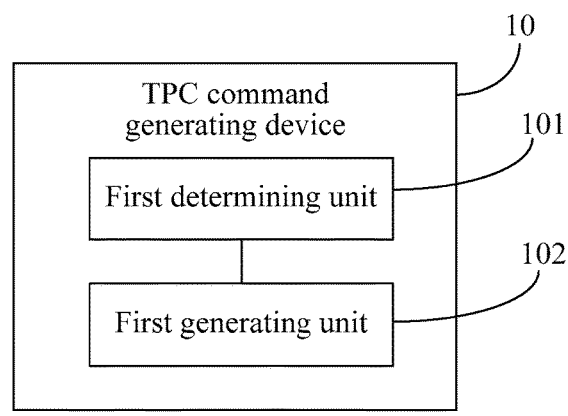
FIG. 2 is a schematic structural diagram of a TPC command generating device according to an embodiment of the present invention.

An embodiment of the present invention provides a TPC command generating device 10. The TPC command generating device 10 may be applied to UE, and, as shown in FIG. 2, TPC command includes:

a first determining unit 101 and a first generating unit 102.

The first determining unit 101 is configured to determine a target cell in at least one non-serving HS-DSCH cell included in an active set of the UE.

The active set is a set of cells participating in a soft handover process of the UE, and soft handover is an existing handover process. In the soft handover process, a radio link of the UE may be added or deleted, but the UE needs to retain at least one radio link.

The first generating unit 102 is configured to generate a TPC command of the target cell according to a measurement result of a downlink channel of the target cell.

To sum up, a first determining unit determines a target cell in at least one non-serving HS-DSCH cell, so that UE can determine to measure a downlink channel of which non-serving HS-DSCH cell, and therefore, obtain a corresponding measurement result, so that a first generating unit can generate a TPC command of the target cell according to the measurement result, thereby at least generating the TPC command corresponding to the target cell.

Figure 3:
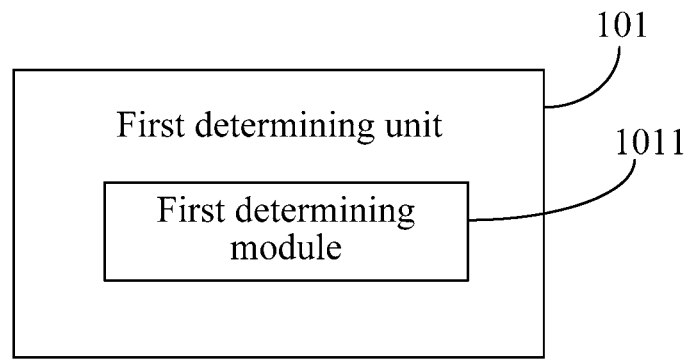
FIG. 3 is a schematic structural diagram of a first determining unit according to an embodiment of the present invention.

Specifically, as shown in FIG. 3, the first determining unit 101 may include:

a first determining module 1011, configured to determine the target cell in the at least one non-serving HS-DSCH cell by using indication information acquired from a control device, where the indication information is used to instruct the user equipment to determine the target cell in the at least one non-serving HS-DSCH cell included in the active set of the user equipment.

Optionally, when the indication information is cell indication information, the cell indication information is used to identify the target cell, and the first determining module 1011 is specifically configured to:

receive the cell indication information sent by the control device; and determine, according to the cell indication information, a cell corresponding to the cell indication information in the at least one non-serving HS-DSCH cell as the target cell. The cell indication information may include at least one of a radio link identifier, a cell scrambling code, and a cell identifier.

Optionally, when the indication information is a subsidiary indication configured for a downlink channel of the non-serving HS-DSCH cell, the first determining module 1011 is specifically configured to:

when the subsidiary indication is configured for the downlink channel of the at least one non-serving HS-DSCH cell, acquire the subsidiary indication; and determine the target cell in the at least one non-serving HS-DSCH cell according to the subsidiary indication.

Optionally, the first determining unit 101 may specifically be configured to:

after an uplink serving cell and a downlink serving cell of the UE are decoupled, acquire a serving E-DCH cell in the at least one non-serving HS-DSCH cell; and determine the serving E-DCH cell as the target cell.

Optionally, the first determining unit 101 may specifically be configured to:

acquire an assisting serving HS-DSCH cell in the at least one non-serving HS-DSCH cell; and determine the assisting serving HS-DSCH cell as the target cell.

Figure 4:
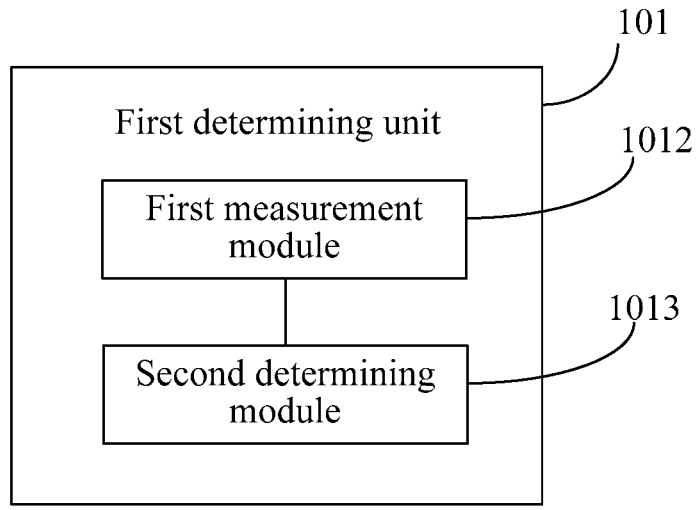
FIG. 4 is a schematic structural diagram of another first determining unit according to an embodiment of the present invention.

Further, as shown in FIG. 4, the first determining unit 101 may include:

a first measurement module 1012 and a second determining module 1013, where the first measurement module 1012 is configured to measure preset parameters of all non-serving HS-DSCH cells in the at least one non-serving HS-DSCH cell; and the second determining module 1013 is configured to determine the target cell in the at least one non-serving HS-DSCH cell according to measurement results of the preset parameters.

Optionally, the preset parameter may be a channel quality value of the downlink channel, and the second determining module 1013 is specifically configured to:

determine a non-serving HS-DSCH cell having a downlink channel with the worst channel quality value in all the non-serving HS-DSCH cells as the target cell; or determine a non-serving HS-DSCH cell having a downlink channel with the best channel quality value in all the non-serving HS-DSCH cells as the target cell.

Optionally, when the preset parameter is a path loss between the non-serving HS-DSCH cell and the UE, the second determining module 1013 is specifically configured to: determine a non-serving HS-DSCH cell between which and the UE a path loss is smallest as the target cell.

Optionally, the first determining unit 101 may specifically be configured to: determine all non-serving HS-DSCH cells in the at least one non-serving HS-DSCH cell as the target cells.

Optionally, the first generating unit 102 may specifically be configured to: when at least two target cells exist, measure quality of downlink channels of all the target cells; perform a weighted average calculation on measured channel quality values of the downlink channels of all the target cells that are obtained through measurement, to obtain a comprehensive channel quality value; compare the comprehensive channel quality value with an acquired target channel quality value; and generate a TPC command according to a comparison result.

Figure 5:
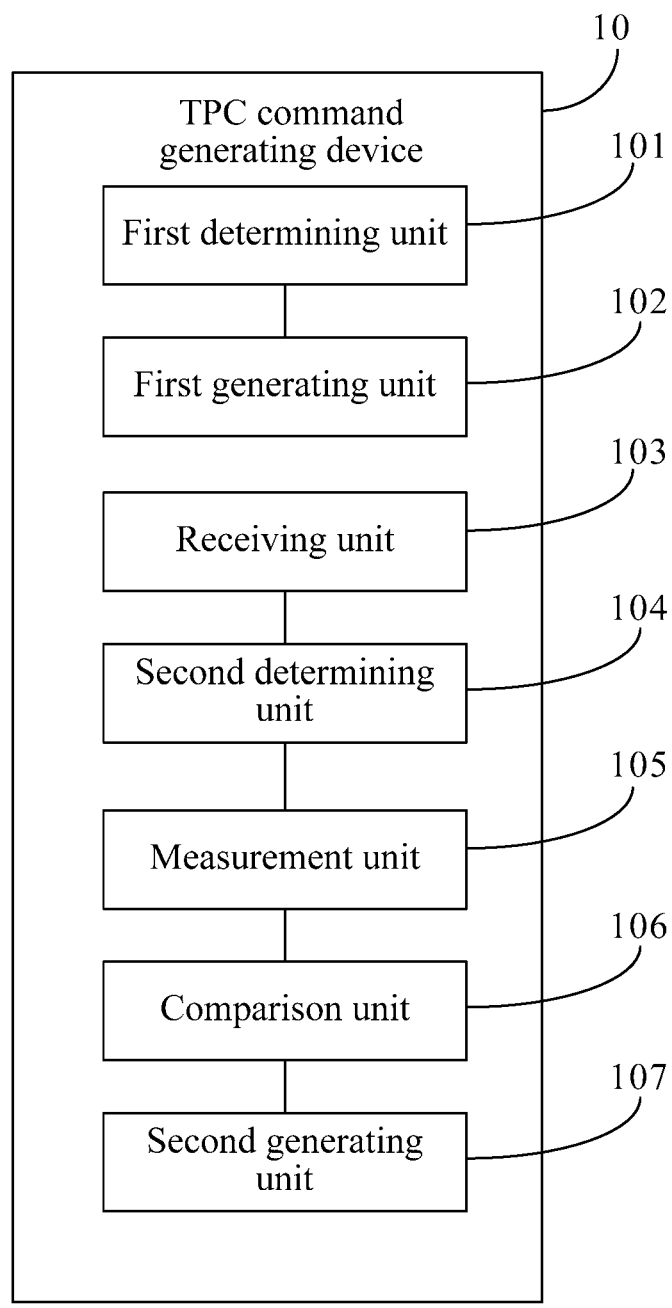
FIG. 5 is a schematic structural diagram of another TPC command generating device according to an embodiment of the present invention.

FIG. 5 is a schematic structural diagram of another TPC command generating device according to an embodiment of the present invention. The TPC command generating device 10 may include:

a first determining unit 101, a first generating unit 102, a receiving unit 103, a second determining unit 104, a measurement unit 105, a comparison unit 106, and a second generating unit 107, where the first determining unit 101 is configured to determine a target cell in at least one non-serving HS-DSCH cell included in an active set of UE;

the first generating unit 102 is configured to generate a TPC command of the target cell according to a measurement result of a downlink channel of the target cell;

the receiving unit 103 is configured to receive a first measurement parameter sent by a control device;

the second determining unit 104 is configured to determine a first target channel quality value according to the first measurement parameter;

the measurement unit 105 is configured to measure a downlink channel of a serving HS-DSCH cell to obtain a first measured channel quality value;

the comparison unit 106 is configured to compare the first target channel quality value with the first measured channel quality value; and the second generating unit 107 is configured to generate a TPC command of the serving HS-DSCH cell according to a comparison result, where the TPC command of the serving HS-DSCH cell is used to instruct to adjust transmit power of the serving HS-DSCH cell.

Figure 6:
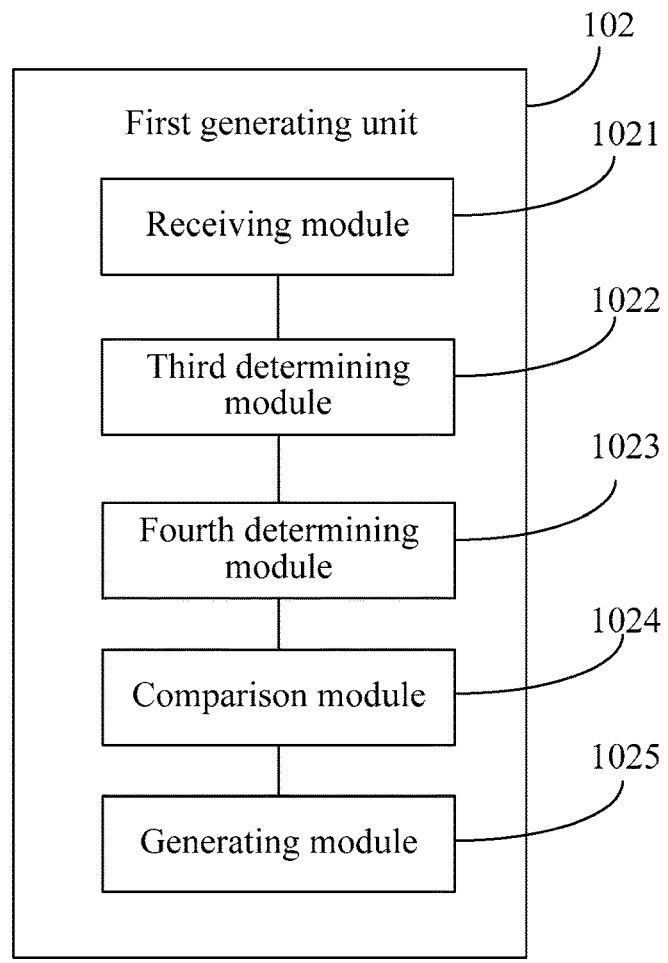
FIG. 6 is a schematic structural diagram of a first generating unit according to an embodiment of the present invention.

As shown in FIG. 6, the first generating unit 102 includes:

a receiving module 1021, a third determining module 1022, a fourth determining module 1023, a comparison module 1024, and a generating module 1025, where the receiving module 1021 is configured to receive a second measurement parameter sent by the control device;

the third determining module 1022 is configured to determine a second target channel quality value according to the second measurement parameter;

the fourth determining module 1023 is configured to measure the downlink channel of the target cell to obtain a second measured channel quality value;

the comparison module 1024 is configured to compare the second target channel quality value with the second measured channel quality value; and the generating module 1025 is configured to generate the TPC command of the target cell according to a comparison result, where the TPC command of the target cell is used to instruct to adjust transmit power of the target cell.

The first measurement parameter is a first TPC error rate, and the second measurement parameter is a second TPC error rate, and the second determining unit 104 is specifically configured to:

determine, according to the first TPC error rate, a target SIR corresponding to the first TPC error rate; and use the target SIR as the first target channel quality value; and the fourth determining module 1016 is specifically configured to:

determine, according to the second TPC error rate, a target SIR corresponding to the second TPC error rate; and use the target SIR as the second target channel quality value.

It should be noted that the downlink channel may be an F-DPCH or a DPCH (dedicated physical channel).

To sum up, a first determining unit determines a target cell in at least one non-serving HS-DSCH cell, so that UE can determine to measure a downlink channel of which non-serving HS-DSCH cell, and therefore, obtain a corresponding measurement result, so that a first generating unit can generate a TPC command of the target cell according to the measurement result, thereby at least generating the TPC command corresponding to the target cell.

Figure 7:
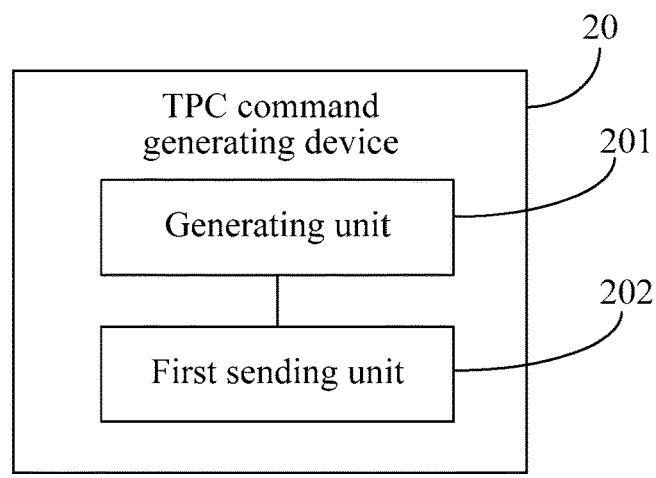
FIG. 7 is a schematic structural diagram of still another TPC command generating device according to an embodiment of the present invention.

An embodiment of the present invention provides a TPC command generating device 20, which may be applied to a control device, and the control device may be an RNC or a base station. As shown in FIG. 7, the TPC command generating device 20 includes:

a generating unit 201 and a first sending unit 202, where the generating unit 201 is configured to generate indication information, where the indication information is used to instruct UE to determine a target cell in at least one non-serving HS-DSCH cell included in an active set of the UE; and the first sending unit 202 is configured to send the indication information to the UE, so that the UE generates a TPC command of the target cell according to a measurement result of a downlink channel of the determined target cell.

To sum up, a first sending unit sends, to UE, indication information that is used to indicate a target cell and that is generated by a generating unit, so that the UE can determine the target cell in at least one non-serving HS-DSCH cell according to the indication information, and can determine to measure a downlink channel of which non-serving HS-DSCH cell, obtain a corresponding measurement result, and generate a TPC command of the target cell according to the measurement result, thereby at least generating the TPC command corresponding to the target cell.

When the indication information is cell indication information, the cell indication information is used to identify the target cell. The cell indication information may include at least one of a radio link identifier, a cell scrambling code, and a cell identifier.

When the indication information is a subsidiary indication configured for a downlink channel of the non-serving HS-DSCH cell, the generating unit 201 is specifically configured to: configure the subsidiary indication for the downlink channel of the at least one non-serving HS-DSCH cell.

Figure 8:
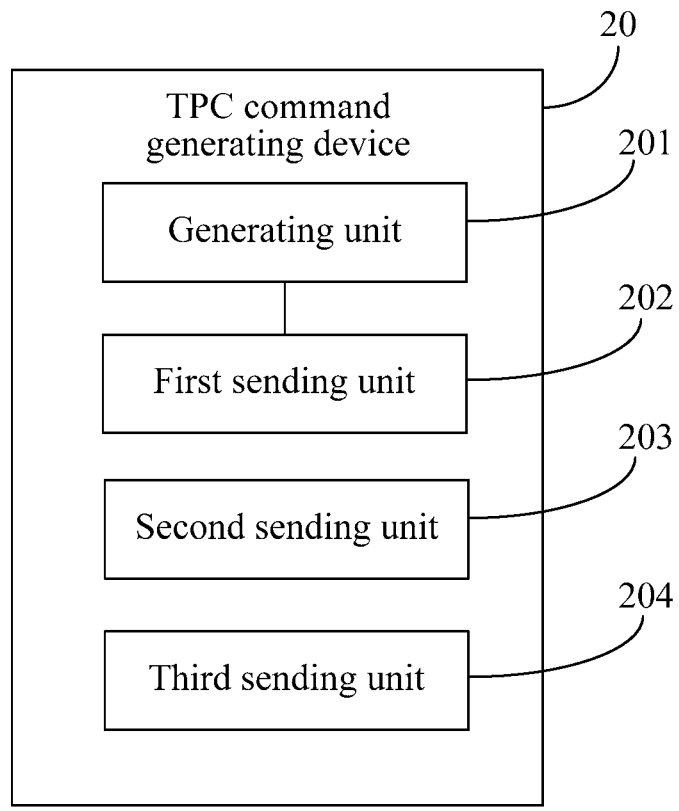
FIG. 8 is a schematic structural diagram of yet another TPC command generating device according to an embodiment of the present invention.

An embodiment of the present invention provides a schematic structural diagram of yet another TPC command generating device. As shown in FIG. 8, the TPC command generating device 20 includes:

a generating unit 201, a first sending unit 202, a second sending unit 203, and a third sending unit 204, where the generating unit 201 is configured to generate indication information, where the indication information is used to instruct UE to determine a target cell in at least one non-serving HS-DSCH cell included in an active set of the UE;

the first sending unit 202 is configured to send the indication information to the UE, so that the UE generates a TPC command of the target cell according to a measurement result of a downlink channel of the determined target cell;

the second sending unit 203 is configured to send a first measurement parameter to the UE, so that the UE determines a first target channel quality value according to the first measurement parameter, measures a downlink channel of a serving HS-DSCH cell to obtain a first measured channel quality value, compares the first target channel quality value with the first measured channel quality value, and generates a TPC command of the serving HS-DSCH cell according to a comparison result; and the third sending unit 204 is configured to send a second measurement parameter to the UE, so that the UE determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell.

Optionally, the first measurement parameter may be a first TPC error rate, and the second measurement parameter may be a second TPC error rate.

In this embodiment of the present invention, the downlink channel may be an F-DPCH or a DPCH. The at least one non-serving HS-DSCH cell includes at least one of an assisting serving HS-DSCH cell and a serving E-DCH cell.

To sum up, a first sending unit sends, to UE, indication information that is used to indicate a target cell and that is generated by a generating unit, so that the UE can determine the target cell in at least one non-serving HS-DSCH cell according to according to the indication information, and can determine to measure a downlink channel of which non-serving HS-DSCH cell, obtain a corresponding measurement result, and generate a TPC command of the target cell according to the measurement result, thereby at least generating the TPC command corresponding to the target cell.

An embodiment of the present invention provides a TPC command generating system. The TPC command generating system includes UE and a control device, where the UE includes the TPC command generating device shown in either of FIG. 2 and FIG. 5; and the control device includes the TPC command generating device shown in either of FIG. 7 and FIG. 8.

Figure 9:
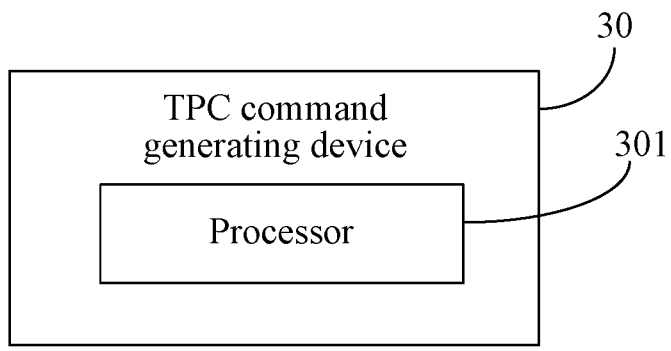
FIG. 9 is a schematic structural diagram of a TPC command generating device according to another embodiment of the present invention.

Another embodiment of the present invention provides a TPC command generating device 30, which is applicable to UE. As shown in FIG. 9, the TPC command generating device 30 includes:

a processor 301, configured to determine a target cell in at least one non-serving high speed downlink shared channel HS-DSCH cell included in an active set of the UE, where the processor 301 is further configured to generate a TPC command of the target cell according to a measurement result of a downlink channel of the target cell.

To sum up, a processor determines a target cell in at least one non-serving HS-DSCH cell, so that the processor can determine to measure a downlink channel of which non-serving HS-DSCH cell, and therefore, obtain a corresponding measurement result, and generate a TPC command of the target cell according to the measurement result, thereby at least generating the TPC command corresponding to the target cell.

Optionally, the processor 301 is specifically configured to:

determine the target cell in the at least one non-serving HS-DSCH cell by using indication information acquired from a control device, where the indication information is used to instruct the user equipment to determine the target cell in the at least one non-serving HS-DSCH cell included in the active set of the user equipment.

Figure 10:
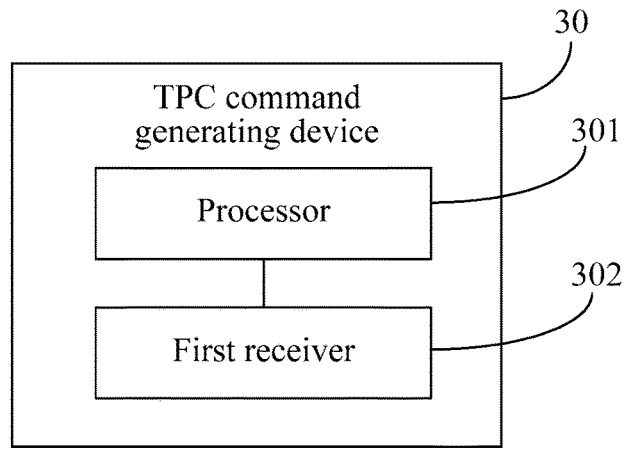
FIG. 10 is a schematic structural diagram of another TPC command generating device according to another embodiment of the present invention.

Further, the indication information is cell indication information, and the cell indication information is used to identify the target cell. As shown in FIG. 10, the TPC command generating device 30 further includes:

a first receiver 302, configured to receive the cell indication information sent by the control device; and the processor 301 is further configured to determine, according to the cell indication information, a cell corresponding to the cell indication information in the at least one non-serving HS-DSCH cell as the target cell.

The cell indication information includes at least one of a radio link identifier, a cell scrambling code, and a cell identifier.

Optionally, the indication information is a subsidiary indication configured for a downlink channel of the non-serving HS-DSCH cell, and the processor 301 is specifically configured to:

when the subsidiary indication is configured for the downlink channel of the at least one non-serving HS-DSCH cell, acquire the subsidiary indication; and determine the target cell in the at least one non-serving HS-DSCH cell according to the subsidiary indication.

Optionally, the processor 301 is specifically configured to:

after an uplink serving cell and a downlink serving cell of the UE are decoupled, acquire a serving enhanced dedicated channel E-DCH cell in the at least one non-serving HS-DSCH cell; and determine the serving E-DCH cell as the target cell.

Optionally, the processor 301 is specifically configured to:

acquire an assisting serving HS-DSCH cell in the at least one non-serving HS-DSCH cell; and determine the assisting serving HS-DSCH cell as the target cell.

Optionally, the processor 301 is specifically configured to:

measure preset parameters of all non-serving HS-DSCH cells in the at least one non-serving HS-DSCH cell; and determine the target cell in the at least one non-serving HS-DSCH cell according to measurement results of the preset parameters.

Optionally, the preset parameter is a channel quality value of the downlink channel, and the processor 301 is specifically configured to:

determine a non-serving HS-DSCH cell having a downlink channel with the worst channel quality value in all the non-serving HS-DSCH cells as the target cell; or determine a non-serving HS-DSCH cell having a downlink channel with the best channel quality value in all the non-serving HS-DSCH cells as the target cell.

Optionally, the preset parameter is a path loss between the non-serving HS-DSCH cell and the UE, and the processor 301 is specifically configured to:

determine a non-serving HS-DSCH cell between which and the UE a path loss is smallest as the target cell.

Optionally, the processor 301 is specifically configured to:

determine all non-serving HS-DSCH cells in the at least one non-serving HS-DSCH cell as the target cells.

The processor 301 is specifically configured to:

optionally, when at least two target cells exist, measure quality of downlink channels of all the target cells; perform a weighted average calculation on measured channel quality values of the downlink channels of all the target cells that are obtained through measurement, to obtain a comprehensive channel quality value; compare the comprehensive channel quality value with an acquired target channel quality value; and generate a TPC command according to a comparison result.

Figure 11:
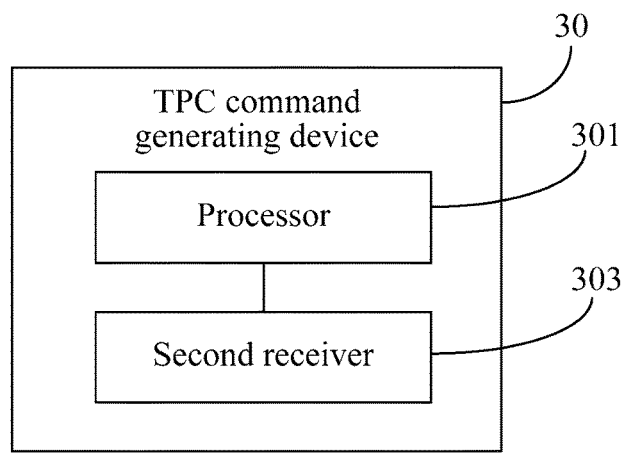
FIG. 11 is a schematic structural diagram of still another TPC command generating device according to another embodiment of the present invention.

Optionally, as shown in FIG. 11, the TPC command generating device 30 further includes:

a second receiver 303, configured to receive a first measurement parameter sent by the control device, where the processor 301 is further configured to:

determine a first target channel quality value according to the first measurement parameter; measure a downlink channel of the serving HS-DSCH cell to obtain a first measured channel quality value; compare the first target channel quality value with the first measured channel quality value; and generate a TPC command of the serving HS-DSCH cell according to a comparison result, where the TPC command of the serving HS-DSCH cell is used to instruct to adjust transmit power of the serving HS-DSCH cell; and the second receiver 303 is further configured to receive a second measurement parameter sent by the control device, where the processor 301 is further configured to: determine a second target channel quality value according to the second measurement parameter; measure the downlink channel of the target cell to obtain a second measured channel quality value; compare the second target channel quality value with the second measured channel quality value; and generate the TPC command of the target cell according to a comparison result, where the TPC command of the target cell is used to instruct to adjust transmit power of the target cell.

Optionally, the first measurement parameter may be a first TPC error rate, and the second measurement parameter may be a second TPC error rate, and the processor is specifically configured to:

determine, according to the first TPC error rate, a target SIR corresponding to the first TPC error rate; and use the target SIR as the first target channel quality value; and the processor is specifically configured to: determine, according to the second TPC error rate, a target SIR corresponding to the second TPC error rate; and use the target SIR as the second target channel quality value.

Optionally, the downlink channel is an F-DPCH or a DPCH.

Optionally, the at least one non-serving HS-DSCH cell includes at least one of an assisting serving HS-DSCH cell and a serving E-DCH cell.

It should be noted that the first receiver 302 and the second receiver 303 may be a same receiver.

To sum up, a processor determines a target cell in at least one non-serving HS-DSCH cell, so that the processor can determine to measure a downlink channel of which non-serving HS-DSCH cell, and therefore, obtain a corresponding measurement result, and generate a TPC command of the target cell according to the measurement result, thereby at least generating the TPC command corresponding to the target cell.

Figure 12:
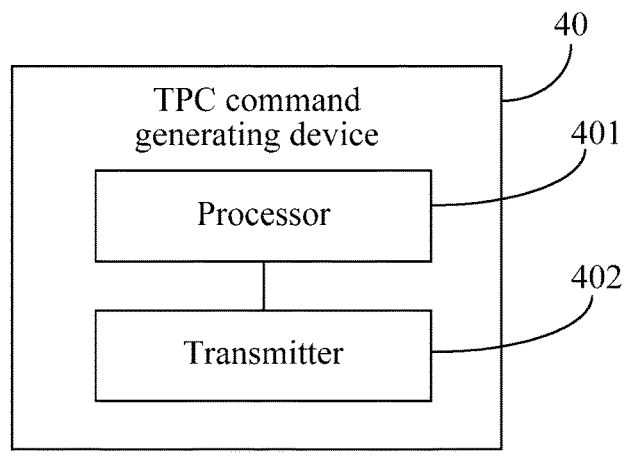
FIG. 12 is a schematic structural diagram of yet another TPC command generating device according to another embodiment of the present invention.

Another embodiment of the present invention provides yet another TPC command generating device 40, which may be applied to a control device, and the control device may be an RNC or a base station. As shown in FIG. 12, the TPC command generating device 40 includes:

a processor 401, configured to generate indication information, where the indication information is used to instruct UE to determine a target cell in at least one non-serving HS-DSCH cell included in an active set of the UE; and a transmitter 402, configured to send the indication information to the UE, so that the UE generates a TPC command of the target cell according to a measurement result of a downlink channel of the determined target cell.

To sum up, a transmitter sends, to UE, indication information that is used to indicate a target cell and that is generated by a processor, so that the UE can determine the target cell in at least one non-serving HS-DSCH cell according to according to the indication information, and can determine to measure a downlink channel of which non-serving HS-DSCH cell, obtain a corresponding measurement result, and generate a TPC command of the target cell according to the measurement result, thereby at least generating the TPC command corresponding to the target cell.

Optionally, the indication information is cell indication information, and the cell indication information is used to identify the target cell.

Optionally, the cell indication information includes at least one of a radio link identifier, a cell scrambling code, and a cell identifier.

Optionally, the indication information is a subsidiary indication configured for a downlink channel of the non-serving HS-DSCH cell, and the processor 401 is specifically configured to: configure the subsidiary indication for the downlink channel of the at least one non-serving HS-DSCH cell.

Optionally, the active set of the UE further includes a serving HS-DSCH cell, and the transmitter 402 is further configured to: send a first measurement parameter to the UE, so that the UE determines a first target channel quality value according to the first measurement parameter, measures a downlink channel of the serving HS-DSCH cell to obtain a first measured channel quality value, compares the first target channel quality value with the first measured channel quality value, and generates a TPC command of the serving HS-DSCH cell according to a comparison result; and send a second measurement parameter to the UE, so that the UE determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell.

Optionally, the first measurement parameter is a first TPC error rate, and the second measurement parameter is a second TPC error rate.

Optionally, the downlink channel is an F-DPCH or a DPCH. The at least one non-serving HS-DSCH cell includes at least one of an assisting serving HS-DSCH cell and a serving E-DCH cell.

To sum up, a transmitter sends, to UE, indication information that is used to indicate a target cell and that is generated by a processor, so that the UE can determine the target cell in at least one non-serving HS-DSCH cell according to according to the indication information, and can determine to measure a downlink channel of which non-serving HS-DSCH cell, obtain a corresponding measurement result, and generate a TPC command of the target cell according to the measurement result, thereby at least generating the TPC command corresponding to the target cell.

An embodiment of the present invention provides a TPC command generating system. The TPC command generating system includes UE and a control device, where the UE includes the TPC command generating device shown in any one of FIG. 9 to FIG. 11; and the control device includes the TPC command generating device shown in FIG. 12.

The apparatuses provided in the embodiments of the present invention can be used to execute methods described below, and for working processes and working principles of units in the embodiments of the present invention, reference may be made to descriptions in the following embodiments.

Figure 13:
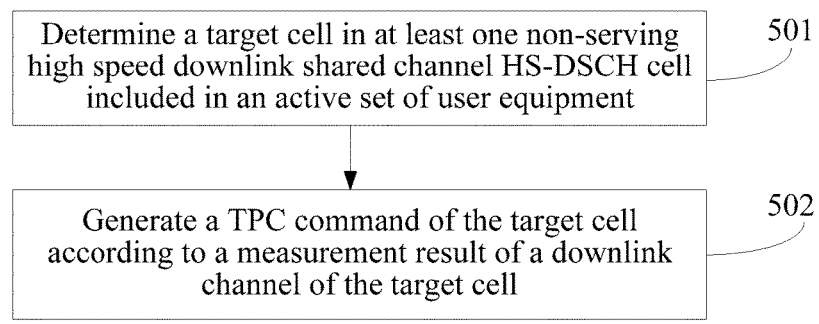
FIG. 13 is a flowchart of a TPC command generating method according to an embodiment of the present invention.

An embodiment of the present invention provides a TPC command generating method, which is applied to UE in a communications network shown in FIG. 1. As shown in FIG. 13, the method may include but is not limited to the following:

In step 501, determine a target cell in at least one non-serving HS-DSCH cell included in an active set of the user equipment.

In this embodiment of the present invention, the non-serving HS-DSCH cell refers to a cell except a serving HS-DSCH cell in the active set of the UE.

In step 502, generate a TPC command of the target cell according to a measurement result of a downlink channel of the target cell.

The downlink channel may include but is not limited to an F-DPCH or a DPCH.

To sum up, a UE determines a target cell in at least one non-serving HS-DSCH cell, so that the UE can determine to measure a downlink channel of which non-serving HS-DSCH cell, and therefore, obtain a corresponding measurement result, and generate a TPC command of the target cell according to the measurement result, thereby at least generating the TPC command corresponding to the target cell.

It should be noted that in step 501, there may be multiple methods for determining a target cell, including but not limited to:

In a first aspect, the UE may determine the target cell in the at least one non-serving HS-DSCH cell by using indication information acquired from a control device, where the indication information is used to instruct the user equipment to determine the target cell in the at least one non-serving HS-DSCH cell included in the active set of the user equipment.

For example, the indication information may be cell indication information, and the cell indication information is used to identify the target cell. The UE may receive the cell indication information sent by the control device, and determine, according to the cell indication information, a cell corresponding to the cell indication information in the at least one non-serving HS-DSCH cell as the target cell. The cell indication information may include but is not limited to at least one of a radio link identifier, a cell scrambling code, and a cell identifier.

For example, the indication information may also be a subsidiary indication configured for a downlink channel of the non-serving HS-DSCH cell, and when the subsidiary indication is configured for the downlink channel of the at least one non-serving HS-DSCH cell, the UE may acquire the subsidiary indication, and determine the target cell in the at least one non-serving HS-DSCH cell according to the subsidiary indication.

In a second aspect, after an uplink serving cell and a downlink serving cell of the UE are decoupled, the UE may acquire a serving E-DCH cell in the at least one non-serving HS-DSCH cell, and determine the serving E-DCH cell as the target cell.

It should be noted that, in a communications system, for a same UE, there is a serving E-DCH cell, that is, an uplink serving cell, and a serving HS-DSCH cell, that is, a downlink serving cell. Generally, the uplink serving cell and the downlink serving cell are a same cell, but in an actual application, an uplink serving cell and a downlink serving cell may also be set as different cells; and such a case in which the uplink serving cell and the downlink serving cell are different cells may be implemented by decoupling the uplink serving cell and the downlink serving cell of the UE. In this embodiment of the present invention, after the uplink serving cell and the downlink serving cell are decoupled, the uplink serving cell and the downlink serving cell are different cells.

In a third aspect, the UE may acquire an assisting serving HS-DSCH cell in the at least one non-serving HS-DSCH cell, and determine the assisting serving HS-DSCH cell as the target cell.

In a fourth aspect, the UE may measure preset parameters of all non-serving HS-DSCH cells in the at least one non-serving HS-DSCH cell, and determine the target cell in the at least one non-serving HS-DSCH cell according to measurement results of the preset parameters.

When the preset parameter is a channel quality value of the downlink channel, the UE may determine a non-serving HS-DSCH cell having a downlink channel with the worst channel quality value in all the non-serving HS-DSCH cells as the target cell, or determine a non-serving HS-DSCH cell having a downlink channel with the best channel quality value in all the non-serving HS-DSCH cells as the target cell. When the preset parameter is a path loss between the non-serving HS-DSCH cell and the UE, the UE may determine a non-serving HS-DSCH cell between which and the UE a path loss is smallest as the target cell.

In a fifth aspect, the UE may determine all non-serving HS-DSCH cells in the at least one non-serving HS-DSCH cell as the target cells.

Further, the UE may further measure a downlink channel of a serving HS-DSCH cell to generate a TPC command of the serving HS-DSCH cell, which includes but is not limited to: receiving a first measurement parameter sent by the control device; determining a first target channel quality value according to the first measurement parameter; measuring the downlink channel of the serving HS-DSCH cell to obtain a first measured channel quality value; comparing the first target channel quality value with the first measured channel quality value; and generating the TPC command of the serving HS-DSCH cell according to a comparison result, where the TPC command of the serving HS-DSCH cell is used to instruct to adjust transmit power of the serving HS-DSCH cell.

Correspondingly, in step 502, the process of generating a TPC command according to a measurement result of a downlink channel of the target cell may include but is not limited to: receiving a second measurement parameter sent by the control device; determining a second target channel quality value according to the second measurement parameter; measuring the downlink channel of the target cell to obtain a second measured channel quality value; comparing the second target channel quality value with the second measured channel quality value; and generating the TPC command of the target cell according to a comparison result, where the TPC command of the target cell is used to instruct to adjust transmit power of the target cell.

The first measurement parameter is a first TPC error rate, and the second measurement parameter is a second TPC error rate, and the process of determining, by the UE, a first target channel quality value according to the first measurement parameter includes but is not limited to: determining a target SIR according to the first TPC error rate; and using the target SIR as the first target channel quality value.

The process of determining, by the UE, a second target channel quality value according to the second measurement parameter includes but is not limited to: determining, according to the second TPC error rate, a target SIR corresponding to the second TPC error rate; and using the target SIR as the second target channel quality value.

It should be noted that in step 502, when at least two target cells exist, the UE may measure quality of downlink channels of all the target cells; perform a weighted average calculation on measured channel quality values of the downlink channels of all the target cells that are obtained through measurement, to obtain a comprehensive channel quality value; compare the comprehensive channel quality value with an acquired target channel quality value; and generate a TPC command according to a comparison result.

Further, when at least two target cells exist, the UE may measure the quality of the downlink channels of all the target cells; use the best of channel quality values of the downlink channels of all the target cells that are obtained through measurement as the comprehensive channel quality value, or use the worst of channel quality values of the downlink channels of all the target cells that are obtained through measurement as the comprehensive channel quality value, or use a channel quality value of a downlink channel of a non-serving HS-DSCH cell between which and the user equipment a path loss is smallest as the comprehensive channel quality value; compare the comprehensive channel quality value with the acquired target channel quality value; and generate the TPC command according to the comparison result.

To sum up, in the TPC command generating method provided in this embodiment of the present invention, UE determines a target cell in at least one non-serving HS-DSCH cell, so that the UE can determine to measure a downlink channel of which non-serving HS-DSCH cell, and therefore, obtain a corresponding measurement result, and generate a TPC command of the target cell according to the measurement result, thereby at least generating the TPC command corresponding to the target cell. In addition, a control device sets two measurement parameters for the UE, which are separately directed at a serving HS-DSCH cell and the target cell, so that the UE can determine a TPC command of the serving HS-DSCH cell and the TPC command of the target cell according to different target channel quality values. Therefore, generation of the TPC command of the serving HS-DSCH cell and the TPC command of the target cell is more targeted, which can effectively reduce a power overhead of the target cell.

Figure 14:
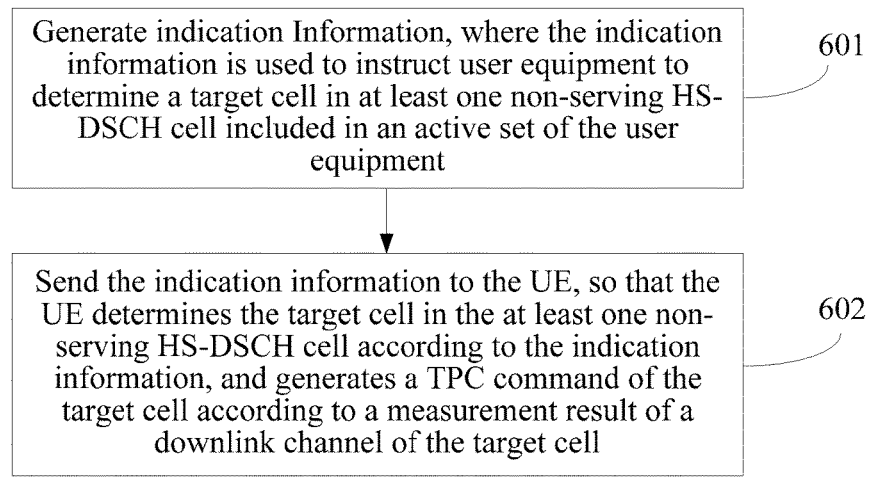
FIG. 14 is a flowchart of another TPC command generating method according to an embodiment of the present invention.

An embodiment of the present invention provides another TPC command generating method, which is applied to a control device in a communications network shown in FIG. 1. The communications network includes the control device and UE, and the control device may be a base station or an RNC. In the communications network, an active set of the UE includes at least two cells, which are a serving HS-DSCH cell and at least one non-serving HS-DSCH cell. The at least one non-serving HS-DSCH cell may include but is not limited to at least one of an assisting serving HS-DSCH cell and a serving E-DCH cell. As shown in FIG. 14, the method includes but is not limited to:

In step 601, generate indication information, where the indication information is used to instruct the user equipment to determine a target cell in the at least one non-serving HS-DSCH cell included in an active set of the user equipment.

In step 602, send the indication information to the UE, so that the UE determines the target cell in the at least one non-serving HS-DSCH cell according to the indication information, and generates a TPC command of the target cell according to a measurement result of a downlink channel of the target cell.

The downlink channel may be an F-DPCH or a DPCH.

To sum up, a control device sends, to UE, indication information that is used to indicate a target cell, so that the UE can determine the target cell in at least one non-serving HS-DSCH cell according to according to the indication information, and can determine to measure a downlink channel of which non-serving HS-DSCH cell, obtain a corresponding measurement result, and generate a TPC command of the target cell according to the measurement result, thereby at least generating the TPC command corresponding to the target cell.

On one hand, the indication information may be cell indication information, and the cell indication information is used to identify the target cell. The cell indication information includes but is not limited to at least one of a radio link identifier, a cell scrambling code, and a cell identifier.

On the other hand, the indication information may be a subsidiary indication configured for a downlink channel of the non-serving HS-DSCH cell, and correspondingly, in step 601, the process of generating indication information includes but is not limited to: configuring the subsidiary indication for the downlink channel of the at least one non-serving HS-DSCH cell.

Further, the control device may further send a measurement parameter to the UE, so that the UE measures a downlink channel of the serving HS-DSCH cell and the downlink channel of the target cell, which includes but is not limited to:

sending a first measurement parameter to the UE, so that the UE determines a first target channel quality value according to the first measurement parameter, measures the downlink channel of the serving HS-DSCH cell to obtain a first measured channel quality value, compares the first target channel quality value with the first measured channel quality value, and generates a TPC command of the serving HS-DSCH cell according to a comparison result; and sending a second measurement parameter to the UE, so that the UE determines a second target channel quality value according to the second measurement parameter, measures the downlink channel of the target cell to obtain a second measured channel quality value, compares the second target channel quality value with the second measured channel quality value, and generates the TPC command of the target cell according to a comparison result, where the TPC command of the serving HS-DSCH cell is used to instruct to adjust transmit power of the serving HS-DSCH cell, and the TPC command of the target cell is used to instruct to adjust transmit power of the target cell; the first measurement parameter may be a first TPC error rate, and the second measurement parameter may be a second TPC error rate.

To sum up, in the TPC command generating method provided in this embodiment of the present invention, UE determines a target cell in at least one non-serving HS-DSCH cell, so that the UE can determine to measure a downlink channel of which non-serving HS-DSCH cell, and therefore, obtain a corresponding measurement result, and generate a TPC command of the target cell according to the measurement result, thereby at least generating the TPC command corresponding to the target cell. In addition, a control device sets two measurement parameters for the UE, which are separately directed at a serving HS-DSCH cell and the target cell, so that the UE can determine a TPC command of the serving HS-DSCH cell and the TPC command of the target cell according to different target channel quality values. Therefore, generation of the TPC command of the serving HS-DSCH cell and the TPC command of the target cell is more targeted, which can effectively reduce a power overhead of the target cell.

Figure 15:
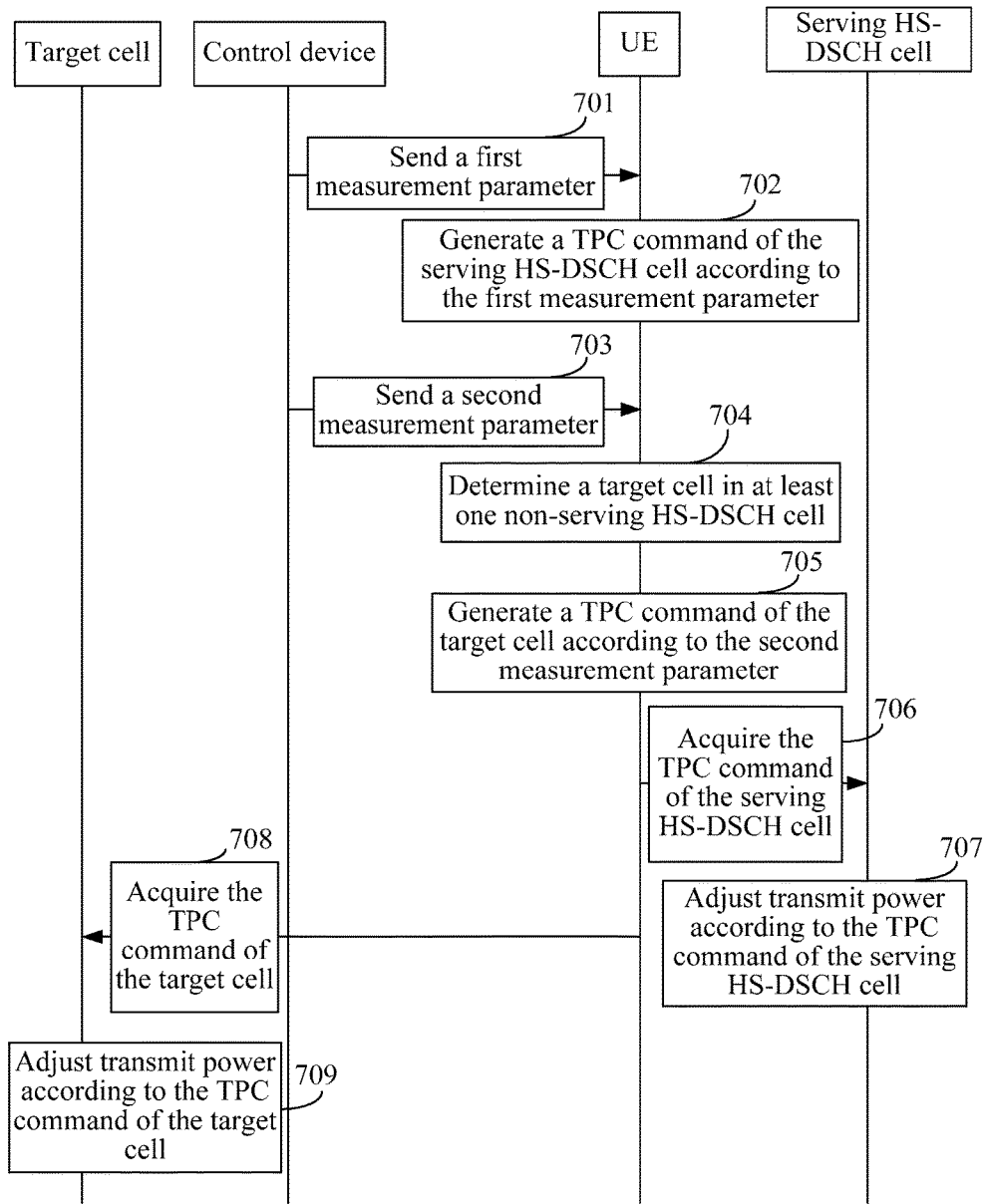
FIG. 15 is a flowchart of still another TPC command generating method according to an embodiment of the present invention.

An embodiment of the present invention provides still another TPC command generating method, which is applied to the communications network shown in FIG. 1, and a control device in the communications network may be an RNC or a base station. As shown in FIG. 15, the method includes but is not limited to:

In step 701, a control device sends a first measurement parameter to UE.

The first measurement parameter is used to provide a measurement standard for measuring a downlink channel of a serving HS-DSCH cell, and the first measurement parameter may be a first TPC error rate, where the first TPC error rate refers to a ratio of a quantity of erroneous TPC commands of the serving HS-DSCH cell to a total quantity of TPC commands of the serving HS-DSCH cell.

In step 702, the UE generates a TPC command of a serving HS-DSCH cell according to the first measurement parameter.

The TPC command of the serving HS-DSCH cell is used to instruct to adjust transmit power of the serving HS-DSCH cell.

Specifically, the UE may determine a first target channel quality value according to the first measurement parameter; then measure a downlink channel of the serving HS-DSCH cell to obtain a first measured channel quality value; compare the first target channel quality value with the first measured channel quality value; and generate the TPC command of the serving HS-DSCH cell according to a comparison result. When the first measurement parameter is the first TPC error rate, the UE may determine a target SIR according to the first TPC error rate, and use the target SIR as the first target channel quality value. It should be noted that when determining a target SIR, the UE may also determine the target SIR according to both the first TPC error rate and a local parameter of the UE; For example, the local parameter of the UE may include but is not limited to a receiving capability of the UE, and the receiving capability is embodied by an SIR required for reaching receiving quality. For different receiving capabilities of UEs, a same first TPC error rate corresponds to different target SIRs. If UE has a strong receiving capability, a low SIR is required; and if UE has a weak receiving capability, a high SIR is required. For example, for an obtained first TPC error rate x, a target SIR required by UE having a strong receiving capability may be less than a target SIR required by UE having a weak receiving capability.

When the first target channel quality value is less than the first measured channel quality value, the generated TPC command of the serving HS-DSCH cell instructs to reduce transmit power of the target cell. For example, the TPC command of the serving HS-DSCH cell may be TPC1=0. When the first target channel quality value is greater than the first measured channel quality value, the generated TPC command of the serving HS-DSCH cell instructs to increase the transmit power of the serving HS-DSCH cell. For example, the TPC command of the serving HS-DSCH cell may be TPC1=1. When the first target channel quality value is equal to the first measured channel quality value, the generated TPC command of the serving HS-DSCH cell instructs to reduce, increase, or maintain the transmit power of the serving HS-DSCH cell. For example, in a case in which the first target channel quality value is equal to the first measured channel quality value, when the TPC command of the serving HS-DSCH cell instructs to reduce the transmit power of the serving HS-DSCH cell, the TPC command of the serving HS-DSCH cell may be TPC1=0; when the TPC command of the serving HS-DSCH cell instructs to increase the transmit power of the serving HS-DSCH cell, the TPC command of the serving HS-DSCH cell may be TPC1=1; and when the TPC command of the serving HS-DSCH cell instructs to maintain the transmit power of the serving HS-DSCH cell, the TPC command of the serving HS-DSCH cell may be TPC1=−1.

It should be noted that in this embodiment of the present invention, the downlink channel may be an F-DPCH or a DPCH.

In step 703, the control device sends a second measurement parameter to the UE.

The second measurement parameter is used to provide a measurement standard for measuring a downlink channel of a non-serving HS-DSCH cell, and the second measurement parameter may be a second TPC error rate, where the second TPC error rate refers to a ratio of a quantity of erroneous TPC commands of the non-serving HS-DSCH cell to a total quantity of TPC commands of the non-serving HS-DSCH cell.

In step 704, the UE determines a target cell in at least one non-serving HS-DSCH cell.

After receiving the second measurement parameter, the UE needs to determine a target cell first before the UE can measure a downlink channel of the target cell according to the second measurement parameter, where there may be multiple methods for determining the target cell, which may include but is not limited to:

In a first aspect, the UE may determine the target cell in the at least one non-serving HS-DSCH cell by using indication information acquired from a control device, where the indication information is used to instruct the user equipment to determine the target cell in the at least one non-serving HS-DSCH cell included in the active set of the user equipment.

For example, the indication information may be cell indication information, and the cell indication information is used to identify the target cell. The UE may receive the cell indication information sent by the control device, and determine, according to the cell indication information, a cell corresponding to the cell indication information in the at least one non-serving HS-DSCH cell as the target cell. The cell indication information may include but is not limited to at least one of a radio link identifier, a cell scrambling code, and a cell identifier. The radio link identifier refers to an identifier of a radio link established between a UE and a cell, and a radio link identifier, a cell scrambling code, and a cell identifier of each cell are all unique. Therefore, a corresponding cell can be determined by acquiring any one of a radio link identifier, a cell scrambling code, and a cell identifier. After acquiring the cell indication information, the UE can determine, according to the cell indication information, that a cell corresponding to the cell indication information is the target cell. It can be understood that a process of determining a target cell may also be regarded as a process of determining a target radio link.

For example, the indication information may also be a subsidiary indication configured for a downlink channel of the non-serving HS-DSCH cell, and when the subsidiary indication is configured for the downlink channel of the at least one non-serving HS-DSCH cell, the UE may acquire the subsidiary indication, and determine the target cell in the at least one non-serving HS-DSCH cell according to the subsidiary indication.

Figure 16:
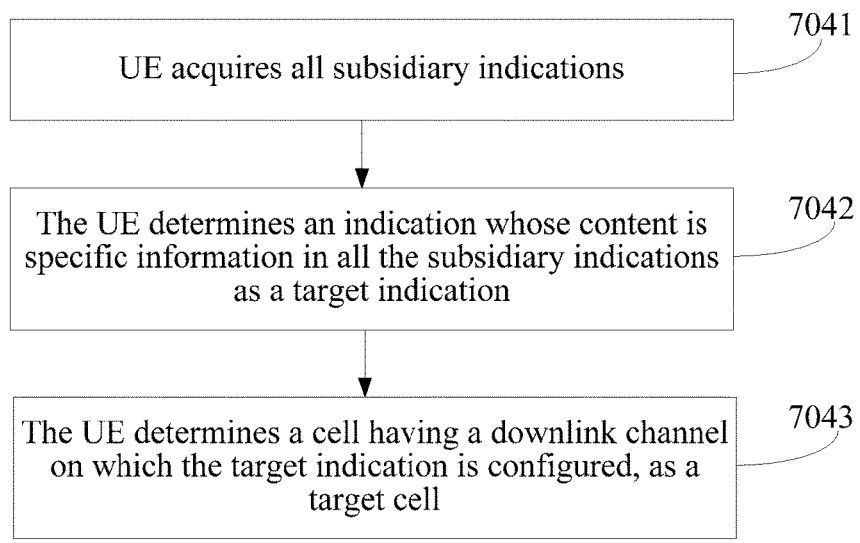
FIG. 16 is a flowchart of a method for determining a target cell by UE according to an embodiment of the present invention.

In this embodiment of the present invention, a new parameter, a subsidiary indication is added to configuration information of a downlink channel, and there are at least two methods for configuring the subsidiary indication; correspondingly, the UE determines the target cell according to different configuration methods, and there are at least the following two methods for determining the target cell by the UE:

First, a Boolean value method. As shown in FIG. 16:

In step 7041, the UE acquires all subsidiary indications.

In step 7042, the UE determines an indication whose content is specific information in all the subsidiary indications as a target indication.

For example, it is assumed that a subsidiary indication configured by the control device is a supplementary item "x", and x may be Yes or No. In this embodiment, assuming that Yes is preset specific information, the UE determines an indication including x=Yes in all the subsidiary indication as a target indication, and a cell having a downlink channel on which the target indication is configured is the target cell; and the UE determines an indication including x=No in the subsidiary indications as a non target indication, and a cell having a downlink channel on which the non target indication is configured is a non target cell.

In step 7043, the UE determines a cell having a downlink channel on which the target indication is configured, as the target cell.

It should be noted that the UE may not receive an indication whose content is specific information due to an unstable transmission link, for example, in all subsidiary indications, x=No, or no subsidiary indication is received, and in this case, the UE may send an error indication to the control device, where the error indication is used to indicate a configuration exception. The control device reconfigures a subsidiary indication according to the error indication, and then the UE acquires the reconfigured subsidiary indication.

Figure 17:
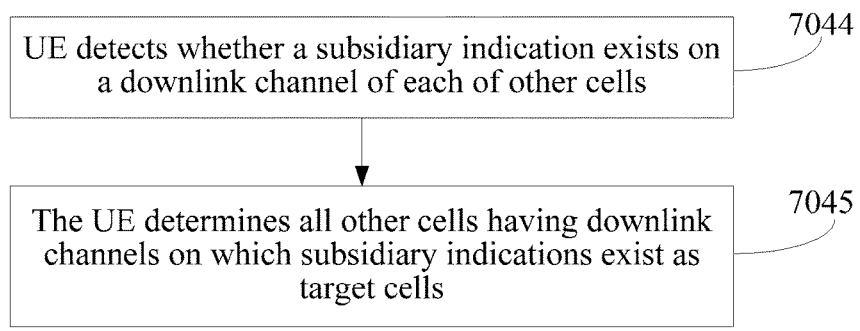
FIG. 17 is a flowchart of another method for determining a target cell by UE according to an embodiment of the present invention.

Second, an enumerated value method. As shown in FIG. 17:

In step 7044, the UE detects whether a subsidiary indication exists on a downlink channel of each non-serving HS-DSCH cell.

In step 7045, the UE determines all non-serving HS-DSCH cells having downlink channels on which subsidiary indications exist as the target cells.

For example, assuming that a subsidiary indication configured by the control device is a supplementary item "x", then a non-serving HS-DSCH cell having a downlink channel on which the supplementary item "x" exists is the target cell, and a non-serving HS-DSCH cell having a downlink channel on which the supplementary item "x" does not exist is a non target cell. Generally, when a supplementary item "x" is configured on a downlink channel, a value of the supplementary item is True.

It should be noted that the UE may receive no subsidiary indication due to an unstable transmission link, for example, no downlink channel is configured with the supplementary item "x". In this case, the UE may send an error indication to the control device, where the error indication is used to indicate a configuration exception. The control device reconfigures a subsidiary indication according to the error indication, and then the UE acquires the reconfigured subsidiary indication.

In a second aspect, after an uplink serving cell and a downlink serving cell of the UE are decoupled, the UE may acquire a serving E-DCH cell in the at least one non-serving HS-DSCH cell, and determine the serving E-DCH cell as the target cell.

It should be noted that, in a communications system, for a same UE, there is a serving E-DCH cell, that is, an uplink serving cell, and a serving HS-DSCH cell, that is, a downlink serving cell. Generally, the uplink serving cell and the downlink serving cell are a same cell, but in an actual application, an uplink serving cell and a downlink serving cell may also be set as different cells; and such a case in which the uplink serving cell and the downlink serving cell are different cells may be implemented by decoupling the uplink serving cell and the downlink serving cell of the UE. In this embodiment of the present invention, after the uplink serving cell and the downlink serving cell are decoupled, the uplink serving cell and the downlink serving cell are different cells.

The UE may determine a serving E-DCH cell according to preset information, and use the serving E-DCH cell as an uplink serving cell after the uplink serving cell and the downlink serving cell of the UE are decoupled, then the control device sends, to the UE, information used to indicate the serving E-DCH cell, and the UE determines the serving E-DCH cell in the at least one non-serving HS-DSCH cell according to the information, and determines the serving E-DCH cell as the target cell.

In a third aspect, the UE may acquire an assisting serving HS-DSCH cell in the at least one non-serving HS-DSCH cell, and determine the assisting serving HS-DSCH cell as the target cell.

In the communications network provided in this embodiment of the present invention, generally, one assisting serving HS-DSCH cell is correspondingly set for one serving HS-DSCH cell, and the UE may determine the assisting serving HS-DSCH cell according to preset information, and then determine the assisting serving HS-DSCH cell as the target cell.

In a fourth aspect, the UE may measure preset parameters of all non-serving HS-DSCH cells in the at least one non-serving HS-DSCH cell, and determine the target cell in the at least one non-serving HS-DSCH cell according to measurement results of the preset parameters.

First, when the preset parameter is a channel quality value of the downlink channel, the UE may determine a non-serving HS-DSCH cell having a downlink channel with the worst channel quality value in all the non-serving HS-DSCH cells as the target cell; or determine a non-serving HS-DSCH cell having a downlink channel with the best channel quality value in all the non-serving HS-DSCH cells as the target cell.

It should be noted that the channel quality value may be a TPC error rate or an SIR.

Second, when the preset parameter is a path loss between the non-serving HS-DSCH cell and the UE, the UE may determine a non-serving HS-DSCH cell between which and the UE a path loss is smallest as the target cell.

It should be noted that a path loss (Path loss) is a loss, introduced by a transmission environment, between a transmitter and a receiver. For example, according to known transmit power of a pilot of a cell A, for example, 33 dBm (decibel-milliwatt), and measured transmit power of the pilot of the cell A, for example, −50 dBm, the UE can estimate that a path loss is 33 dBm−(−50 dBm)=83 dBm.

In a fifth aspect, the UE may determine all non-serving HS-DSCH cells in the at least one non-serving HS-DSCH cell as the target cells.

It should be noted that after determining the target cell, the UE may send configuration response information to the control device, where the configuration response information is used to indicate that the target cell is successfully determined.

In step 705, the UE generates a TPC command of the target cell according to the second measurement parameter.

In this embodiment of the present invention, the TPC command of the target cell is used to instruct to adjust transmit power of the target cell.

Specifically, the UE may determine a second target channel quality value according to the second measurement parameter; then measure the downlink channel of the target cell to obtain a second measured channel quality value; compare the second target channel quality value with the second measured channel quality value; and generate the TPC command of the target cell according to a comparison result. When the second measurement parameter is a second TPC error rate, the UE may determine, according to the second TPC error rate, a target SIR corresponding to the second TPC error rate, and use the target SIR as the second target channel quality value. It should be noted that when determining a target SIR, the UE may also determine the target SIR according to both the second TPC error rate and a local parameter of the UE, for example, the local parameter of the UE may include but is not limited to a receiving capability of the UE, and the receiving capability is embodied by an SIR required for reaching receiving quality. For different receiving capabilities of UEs, a same second TPC error rate corresponds to different target SIRs. If UE has a strong receiving capability, a low SIR is required; and if UE has a weak receiving capability, a high SIR is required. For example, for an obtained second TPC error rate y, a target SIR required by UE having a strong receiving capability may be less than a target SIR required by UE having a weak receiving capability.

When the second target channel quality value is less than the second measured channel quality value, the generated TPC command of the target cell instructs to reduce transmit power of the target cell. For example, the TPC command of the target cell may be TPC2=0. When the second target channel quality value is greater than the second measured channel quality value, the generated TPC command of the target cell instructs to increase the transmit power of the target cell. For example, the TPC command of the target cell may be TPC2=1. When the second target channel quality value is equal to the second measured channel quality value, the generated TPC command of the target cell instructs to reduce, increase, or maintain the transmit power of the target cell. For example, in a case in which the second target channel quality value is equal to the second measured channel quality value, when the TPC command of the target cell instructs to reduce the transmit power of the target cell, the second TPC command may be TPC2=0; when the TPC command of the target cell instructs to increase the transmit power of the target cell, the TPC command of the target cell may be TPC2=1; and when the TPC command of the target cell instructs to maintain the transmit power of the target cell, the TPC command of the target cell may be TPC2=−1.

Generally, the control device sets one measurement parameter for the UE, and correspondingly, the UE determines one target channel quality value according to the measurement parameter, and separately generates the TPC command of the serving HS-DSCH cell and the TPC command of the target cell according to the target channel quality value. However, if available transmit power of the target cell is much less than that of the serving HS-DSCH cell, quality of the downlink channel of the serving HS-DSCH cell may converge to preset quality, and a power overhead of the downlink channel accounts for a small proportion of total power of the serving HS-DSCH cell; however, a power overhead of the downlink channel of the target cell may account for a large proportion of total power of the target cell, and preset quality of the downlink channel may not be reached. For example, under a same condition, available transmit power of the downlink channel of the serving HS-DSCH cell is 20 W (watt), and available transmit power of the downlink channel of the target cell is 2 W. When the TPC command of the serving HS-DSCH cell and the TPC command of the target cell that are determined according to a same target channel quality value both instruct to converge the transmit power to 2 W, an overhead of the serving HS-DSCH cell is 2/20=10%, and an overhead of the target cell is 2/2=100%; therefore, after adjusting the transmit power of the downlink channel, the target cell cannot provide another service, such as a data service, for the UE. As a result, the power overhead of the target cell is high.

In this embodiment of the present invention, the control device sets two measurement parameters for the UE, which are separately directed at the serving HS-DSCH cell and the target cell, so that the UE determines the TPC command of the serving HS-DSCH cell and the TPC command of the target cell according to different target channel quality values. Therefore, generation of the TPC command of the serving HS-DSCH cell and the TPC command of the target cell is more targeted, which can effectively reduce a power overhead of the target cell.

It should be noted that when at least two target cells exist, the UE may measure quality of downlink channels of all the target cells; perform a weighted average calculation on measured channel quality values of the downlink channels of all the target cells that are obtained through measurement, to obtain a comprehensive channel quality value; compare the comprehensive channel quality value with an acquired target channel quality value; and generate a TPC command according to a comparison result. In a process of obtaining the comprehensive channel quality value, a weighted value may be set according to a specific case; For example, all the weighted values may be set to 1, and the obtained comprehensive channel quality value is an average value of all measured channel quality values.

Further, when at least two target cells exist, the UE may measure the quality of the downlink channels of all the target cells; use the best of channel quality values of the downlink channels of all the target cells that are obtained through measurement as the comprehensive channel quality value, or use the worst of channel quality values of the downlink channels of all the target cells that are obtained through measurement as the comprehensive channel quality value, or use a channel quality value of a downlink channel of a non-serving HS-DSCH cell between which and the user equipment a path loss is smallest as the comprehensive channel quality value; compare the comprehensive channel quality value with the acquired target channel quality value; and generate the TPC command according to the comparison result.

In step 706, the serving HS-DSCH cell acquires the TPC command of the serving HS-DSCH cell from the UE.

In this embodiment of the present invention, the control device may configure a first DPCCH and a second DPCCH for the UE. The first DPCCH carries a TPC command used to adjust transmit power of the downlink channel of the target cell, that is, the TPC command of the target cell; and the second DPCCH carries a TPC command used to adjust transmit power of the downlink channel of the serving HS-DSCH cell, that is, the TPC command of the serving HS-DSCH cell.

Correspondingly, the serving HS-DSCH cell may acquire the TPC command of the serving HS-DSCH cell on the first DPCCH.

In step 707, the serving HS-DSCH cell adjusts transmit power according to the TPC command of the serving HS-DSCH cell.

The serving HS-DSCH cell may adjust the transmit power according to the TPC command of the serving HS-DSCH cell. For example, when the TPC command of the serving HS-DSCH cell is TPC1=0, the serving HS-DSCH cell reduces the transmit power of the downlink channel; and when the TPC command of the serving HS-DSCH cell is TPC1=1, the serving HS-DSCH cell increases the transmit power of the downlink channel.

In step 708, the target cell acquires the TPC command of the target cell from the UE.

The target cell may acquire the TPC command of the target cell on the second DPCCH.

In step 709, the target cell adjusts transmit power according to the TPC command of the target cell.

The target cell may adjust the transmit power according to the TPC command of the target cell. For example, when the TPC command of the target cell is TPC2=0, the target cell reduces the transmit power of the downlink channel; and when the TPC command of the target cell is TPC2=1, the target cell increases the transmit power of the downlink channel.

It should be noted that a cell except the target cell in the at least one non-serving HS-DSCH cell may adjust, according to a rule preset by the control device, transmit power of a downlink channel of the cell; for example, the cell adjusts the transmit power according to the TPC command of the serving HS-DSCH cell or the TPC command of the target cell, which is not limited in this embodiment.

It should be noted that a sequential order of the steps of the TPC command generating method provided in this embodiment of the present invention may be adjusted properly, and a step may also be correspondingly added or removed as required. Any variation of the method readily figured out by a person skilled in the art within the technical scope disclosed in this embodiment of the present invention shall fall within the protection scope of this embodiment of the present invention, and therefore, details are not described again.

To sum up, in the TPC command generating method provided in this embodiment of the present invention, UE determines a target cell in at least one non-serving HS-DSCH cell, so that the UE can determine to measure a downlink channel of which non-serving HS-DSCH cell, and therefore, obtain a corresponding measurement result, and generate a TPC command of the target cell according to the measurement result, thereby at least generating the TPC command corresponding to the target cell. In addition, a control device sets two measurement parameters for the UE, which are separately directed at a serving HS-DSCH cell and the target cell, so that the UE can determine a TPC command of the serving HS-DSCH cell and the TPC command of the target cell according to different target channel quality values. Therefore, generation of the TPC command of the serving HS-DSCH cell and the TPC command of the target cell is more targeted, which can effectively reduce a power overhead of the target cell.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A transmit power control (TPC) command generating device, comprising:
a processor, configured to determine a target cell in at least one non-serving high speed downlink shared channel (HS-DSCH) cell comprised in an active set of a user equipment,
wherein the processor is further configured to:
generate a TPC command of the target cell according to a measurement result of a downlink channel of the target cell; and
determine the target cell in the at least one non-serving HS-DSCH cell by using indication information acquired from a control device, wherein the indication information is used to instruct the user equipment to determine the target cell in the at least one non-serving HS-DSCH cell, and
wherein the indication information is cell indication information, and the cell indication information is used to identify the target cell, and the TPC command generating device further comprises:
a first receiver, configured to receive the cell indication information sent by the control device; and
the processor is further configured to determine, according to the cell indication information, a cell corresponding to the cell indication information in the at least one non-serving HS-DSCH cell as the target cell.

2. The device according to claim 1, wherein the cell indication information comprises a cell scrambling code.

3. The device according to claim 1, wherein the processor is specifically configured to:
after an uplink serving cell and a downlink serving cell of the user equipment are decoupled, acquire a serving enhanced dedicated channel (E-DCH) cell in the at least one non-serving HS-DSCH cell; and
determine the serving E-DCH cell as the target cell.

4. The device according to claim 1, wherein the downlink channel is a fractional dedicated physical channel (F-DPCH).

5. The device according to claim 1, wherein the at least one non-serving HS-DSCH cell comprises the serving E-DCH cell.

6. A transmit power control (TPC) command generating method, comprising:
determining a target cell in at least one non-serving high speed downlink shared channel (HS-DSCH) cell comprised in an active set of a user equipment; and
generating a TPC command of the target cell according to a measurement result of a downlink channel of the target cell,
wherein the determining a target cell in the at least one non-serving HS-DSCH cell comprised in the active set of the user equipment comprises:
determining the target cell in the at least one non-serving HS-DSCH cell by using indication information acquired from a control device, wherein the indication information is used to instruct the user equipment to determine the target cell in the at least one non-serving HS-DSCH cell, and
wherein the indication information is cell indication information, and the cell indication information is used to identify the target cell, and
the determining the target cell in the at least one non-serving HS-DSCH cell by using indication information acquired from a control device comprises:
receiving the cell indication information sent by the control device; and
determining, according to the cell indication information, a cell corresponding to the cell indication information in the at least one non-serving HS-DSCH cell as the target cell.

7. The method according to claim 6, wherein the cell indication information comprises a cell scrambling code.

8. The method according to claim 6, wherein the determining a target cell in at least one non-serving high speed downlink shared channel HS-DSCH cell comprised in an active set of user equipment comprises:
after an uplink serving cell and a downlink serving cell of the user equipment are decoupled, acquiring a serving enhanced dedicated channel (E-DCH) cell in the at least one non-serving HS-DSCH cell; and
determining the serving E-DCH cell as the target cell.

* * * * *